United States Patent [19]
Kobayashi et al.

[11] Patent Number: 5,168,385
[45] Date of Patent: Dec. 1, 1992

[54] OPTICAL DEVICE AND PRODUCING METHOD THEREFOR

[75] Inventors: Naoki Kobayashi, Tokyo; Shoichi Shimura; Kazuhiro Ohki, both of Yokohama, all of Japan

[73] Assignee: Canon Kabushiki Kaisha, Tokyo, Japan

[21] Appl. No.: 644,621

[22] Filed: Jan. 23, 1991

[30] Foreign Application Priority Data

Jan. 24, 1990 [JP] Japan .................. 2-12462
Jan. 24, 1990 [JP] Japan .................. 2-12463

[51] Int. Cl.$^5$ ............................. G02B 26/08
[52] U.S. Cl. .......................... 359/209; 359/557
[58] Field of Search ........... 350/6.2, 6.6, 486, 487; 359/196, 197, 209, 211, 224, 554, 557, 831, 832

[56] References Cited

U.S. PATENT DOCUMENTS

| | | | |
|---|---|---|---|
| 3,337,287 | 8/1967 | Lessman | 352/244 |
| 3,438,700 | 4/1969 | Gillard | 350/285 |
| 3,514,192 | 5/1970 | de la Cierva | 350/286 |
| 3,544,201 | 1/1971 | Fowler et al. | 359/224 |
| 4,468,663 | 8/1984 | Kalt | 340/815.27 |
| 4,840,473 | 6/1989 | Kushibiki et al. | 350/484 |
| 4,871,244 | 10/1989 | Stanley | 350/486 |
| 4,973,145 | 11/1990 | Kirkwood et al. | 350/623 |

FOREIGN PATENT DOCUMENTS 16-11906 6/1941 Japan .
60-176017 9/1985 Japan .

*Primary Examiner*—Frank Gonzalez
*Attorney, Agent, or Firm*—Fitzpatrick, Cella, Harper & Scinto

[57] ABSTRACT

There is disclosed an optical device capable of deforming a member connecting a pair of optically transparent parallel-faced flat plates, thus varying the mutual angle of the paired flat plates and obtaining a predetermined optical performance on the passing light beam. The connecting member is formed by connecting plural elastic members so as to form Y-shaped or modified Y-shaped cross section in a number at least equal to zero. The connecting member is formed, in at least a part of the elastic members, by one-layered or plural-layered polymer films.

3 Claims, 23 Drawing Sheets

OPTICAL DEVICE AND PRODUCING METHOD THEREFOR

BACKGROUND OF THE INVENTION

1. Field of the Invention

The present invention relates to an optical device capable of arbitrarily varying the optical properties of passing light beam by varying, the relative angle, or vertical angle, of two transparent parallel-faced flat plates enclosing an optically transparent material therein, adapted for use, for example, in a vibration-compensating optical system to be positioned in a part of the phototaking system of a photographic camera, a video camera or the like for compensating the image shaking, resulting from vibration of said phototaking system, and a producing method therefor.

2. Related Background Art

There are already proposed various optical devices composed of two transparent parallel-faced flat plates enclosing, therebetween an optical transparent material such as liquid or silicone rubber, thereby constituting a prism member with variable vertical angle, and capable of arbitrarily varying the optical properties of the passing light beam by varying the relative angle of said two plates by an external biasing force.

For example, FIGS. 64 and 65 are schematic views of an optical device proposed in the Japanese Patent Publication Sho 41-11906. Said optical device is composed of two transparent parallel-faced flat plates 201, 201' positioned in mutually opposed relationship, supported along the periphery by a flexible connecting member 202 and enclosing transparent liquid 203 therein, thereby deflecting an incident light beam h by a certain angle.

FIGS. 66 and 67 are schematic views of an optical device proposed in the Japanese Laid-open application sho 60-176017. Said optical device is composed of two transparent parallel-faced flat plates 221, 221' positioned in mutually opposed relationship and sandwiching a transparent elastic member 224 therebetween, serving to deflect an incident light beam by a certain angle as in the case of FIG. 64. Such conventional optical devices constitute a prism with variable vertical angle, wherein the vertical angle can be arbitrarily controlled by varying the relative angle of two flat plates by an external biasing force as shown in FIGS. 65 and 67.

However, in such conventional optical devices, the change in the angle of two flat plates is achieved by expansion or contraction of a connecting member of a certain material and generally requires a large driving force, requiring a large driving source. Also repeated deformations may result in a partial breakage of the connecting member.

Furthermore, such devices have been associated with drawbacks that the material supported between two flat plates penetrates the connecting member or oozes through the junction between the connecting member and the flat plate, or that the transparent elastic member results in a change in the refractive index by moisture absorption from the air.

Also the adhered portions between the connecting member and the flat plates is subjected to an external force in the drive of the optical device, eventually leading to peeling of the adhered portions and oozing of the internal material.

Furthermore such conventional devices cannot be compactized sufficiently, because the paired parallel-faced flat plates and the supporting member are same in dimension and/or shape.

SUMMARY OF THE INVENTION

An object of the present invention is to provide an optical device constructed as a prism member with variable vertical angle, formed by positioning two transparent parallel-faced flat plates in mutually opposed relationship, connecting said plates with a connecting member so as to form a space therebetween and filling a transparent material therein, wherein the material of said connecting member is suitably so selected that the angle of two flat plates can be easily varied by a small driving force and that the internally sealed material is prevented from deterioration resulting from changes in the ambient conditions, thereby ensuring satisfactory optical performance, and also enabling reduction in size and weight.

Another object of the present invention is to provide an optical device with satisfactory durability of adhesion even under repetitive deformations, by suitable selection of adhering method in adhering the parallel-faced flat plates and the connecting member.

The foregoing objects can be attained, according to the present invention, by an optical device for obtaining a predetermined optical performance on the passing light beam by deforming a connecting member which connects a pair of optically transparent parallel-faced flat plates, thereby regulating the vertical angle of said paired flat plates, wherein said connecting member is composed of plural elastic members which are so connected to form at least zero Y-shaped or modified Y-shaped structure or structures in cross section, and at least a part of the elastic members of said connecting member is composed, for example, of a single- or multi-layered polymer film.

Also said optical device can be compactized to the effective diameter of light beam by modifying the shape or size of the paired parallel-faced flat plates and of the elastic members constituting the connecting member.

Also the producing method for said optical method comprises a first step for adhering plural elastic members in such a manner as to form at least zero Y-shaped or modified Y-shaped structure in cross section thereby forming a connecting member for connecting a pair of transparent parallel-faced flat plates, a second step for adhering the connecting member, formed in said first step, with said paired transparent flat plates in such a manner as to form a space therein after the connection, and a third step for sealing an optically transparent material in the space formed in said second step, wherein said second step includes a step for adhering said connecting member, composed for example of single- or multi-layered polymer films to said parallel-faced flat plate either directly or across a support member for supporting said parallel-faced flat plate.

Furthermore the present invention provides an optical device for obtaining a predetermined optical performance on the passing light beam by deforming a connecting member which connects a pair of optically transparent parallel-faced flat plates, thereby regulating the vertical angle of said paired flat plates, wherein said connecting member is composed of plural elastic members which are so connected as to form bellows, and at least a part of the elastic members of said connecting member is composed for example of a single- or multi-layered polymer film, and said elastic members are so positioned that the parts of said bellows do not mutually interfere.

Furthermore the present invention provides a producing method for said optical device, comprising a first step for adhering each of plural elastic members with adjacent ones thereby forming a bellows-shaped connecting member for connecting a pair of transparent parallel-faced flat plates, a second step for adhering the connecting member, formed in said first step, with said paired transparent flat plates in such a manner as to form a space therein after the connection, and a third step for sealing an optically transparent material in the space formed in said second steps, wherein said second step includes a step for adhering said connecting member, composed for example of single- or multi-layered polymer films to said parallel-faced flat plates either directly or across support members for supporting said parallel-faced flat plates.

DESCRIPTION OF THE PREFERRED EMBODIMENTS

Now the present invention will be clarified in detail by preferred embodiments thereof shown in the attached drawings.

1st Embodiment

Figure 1:
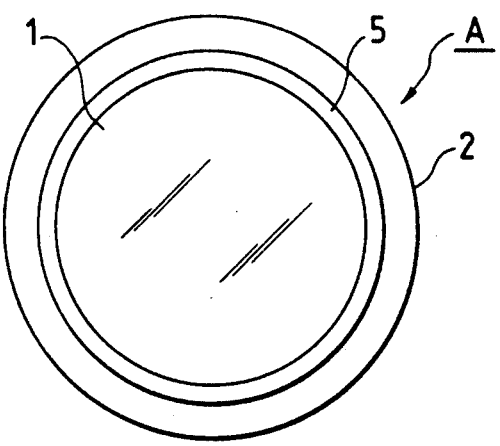
FIG. 1 is a plan view of the principal parts of a first embodiment of the present invention.
Figure 2:
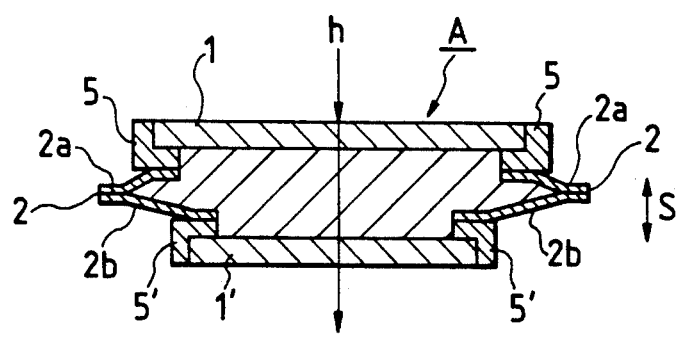
FIG. 2 is a lateral cross-sectional view of the embodiment shown in FIG. 1.

FIG. 1 is a plan view showing principal part of a first embodiment of the present invention, and FIG. 2 is a lateral cross-sectional view of said embodiment shown in FIG. 1.

In FIGS. 1 and 2, there is shown a cylindrical optical device A constituting the first embodiment. Said optical device A is composed of a pair of optically transparent, disk-shaped, parallel-faced flat plates 1, 1' connected with an annular connecting member 2 with a Y-shaped cross section and enclosing therein an optically transparent material such as liquid or silicone rubber, wherein the parallel-faced flat plates 1, 1' are respectively supported by annular support members 5, 5 of an L-shaped cross section provided between said flat plates 1, 1' and the connecting member 2. The optical device A functions as a variable-angle prism member in which the angle (degree of parallelism) of the paired flat plates 1, 1' is varied by an external biasing force, thereby arbitrarily varying the optical properties of the passing light beam. The parallel-faced flat plate 1 has a larger diameter than that of the other flat plate 1'.

The components of the optical device a will be explained in further detail in the following.

The parallel-faced flat plates 1, 1' are composed for example of a plastic material or glass, and are positioned substantially parallel in the absence of the external biasing force, as shown in FIG. 2. The connecting member 2 is an elastic member with a Y-shaped or modified Y-shaped cross section, composed of mutually laminated two annular members 2a, 2b having flexibility and softness such as polymer films or aluminum foils, and is so constructed as to arbitrarily vary the width in a direction S shown in FIG. 2. Also the connecting member 2 is so constructed to have a portion, in an area of the external periphery of the flat plates 1, 1', where the thickness or lateral length of the members 2a, 2b (constituting a Y-shaped cross section) is constant or partially different. The difference in radial lengths of the members 2a, 2b is determined according to the difference in diameter of the flat plates 1, 1'. In FIG. 2, said length is larger in the member 2b than in 2a.

Examples of the optically transparent material 3 includes water, alcohol, glycol, silicone oil, denatured silicone oil, silicone rubber and fluorinated oils. The support members 5, 5' are composed for example of a molded plastic material of a high hardness with an L-shaped cross section as shown in FIG. 2, and support the flat plates 1, 1' by surrounding the periphery thereof. Also use of a composite material obtained by insertion molding of a metal material such as aluminum or stainless steel, or a composite material obtained by comolding or adhesion of another plastic material such as glass-reinforced polyester is preferable for increasing the rigidity of the support members 5, 5'.

The support members 5, 5' and the corresponding flat plates 1, 1' are adhered by a thermoplastic or thermosetting adhesive showing an excellent adhesive power and not influenced for example by swelling or dissolution by the internal liquid 3, such as epoxy, polyamide, polyimide, cyanoacrylate, olefinphenolic, urethane, silicone or halogenated adhesive.

Also rubber adhesives such as NBR (synthetic rubber composed of butadiene-acrylonitrile copolymer), SBR (synthetic rubber composed of butadiene-styrene copolymer), silicone rubber or halogenated rubbers such as fluorinated rubber, are preferred because they are capable of absorbing strains resulting from hardening or contraction after adhesion, or from physical difference, for example in the expansion coefficients or hardnesses, between the support members 5, 5' and the flat plates 1, 1'. Further, silicone and fluorinated adhesives are particularly preferred because of their excellent resistance to solvents and weathering.

As a specific example of the first embodiment, the flat plates 1, 1' were composed of flat glass plates; transparent material 3 of denatured silicone oil (with methylated SiO radicals); support members 5, 5' of polyethylene; and connecting member 2 of linear low-density polyethylene, with a thickness of about 20 microns. A filling inlet was formed in a part of junction between the members 2a, 2b, and the transparent material 3 was filled through said filling inlet while the glass plates 1, 1' were maintained at a predetermined distance. When the material 3 was filled up to the end of said filling inlet, said inlet was closed with a heating member (not shown).

In the following there will be explained the function of the first embodiment.

In the absence of external force to the optical device a, as shown in FIG. 2, the two parallel-faced flat plates 1, 1' are maintained substantially parallel, with a mutual angle almost zero, whereby an incident light h linearly passes through the flat plates 1 and 1' of the optical device A.

Figure 3:
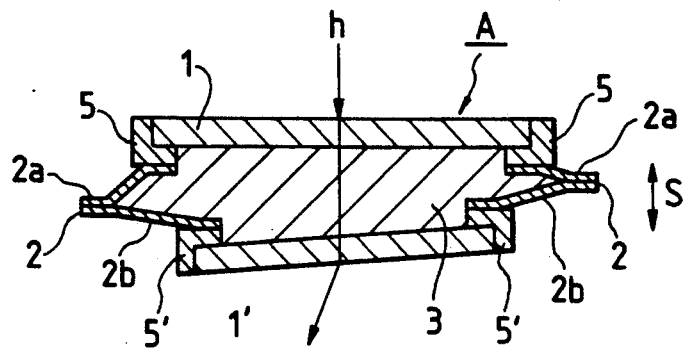
FIG. 3 is a view showing the state when a biasing force is applied to a part of the periphery of the optical device A shown in FIG. 2.

FIG. 3 is a schematic view of the optical device A when a biasing force is applied to a part of the periphery.

Under the external biasing force, the angle of two flat plates 1, 1' varies to a certain magnitude, whereby the optical device A functions as a variable-angle prism member. Thus a light beam h entering the device A from the flat plate 1 is refracted at the flat plate 1', and emerges from the device in a deflected state. Since the material 3 (for example liquid) has a constant volume, the members 2a, 2b constituting the connecting member 2 are extended at the left side but contract at the right side in a direction S shown in FIG. 3, whereby the entire device A deforms a prism.

In the application of the optical device A for example in the phototaking system of a photographic camera or a video camera, the biasing force required for deforming the material 3 (for example liquid) is negligibly small unless the driving speed is very high. Consequently, the driving force required to deform the optical device a is practically determined by the deformation stress of the connecting member 2.

Thus, in this first embodiment, the driving force required for the deformation of the optical device A can be minimized by suitable selection of the material and shape of the connecting member 2. Also reduction in dimension and weight of the optical device A can be achieved by selecting different shapes and diameters for the paired flat plates 1, 1' and selecting different radial sizes for the members 2a, 2b constituting the connecting member 2.

Figure 4A:
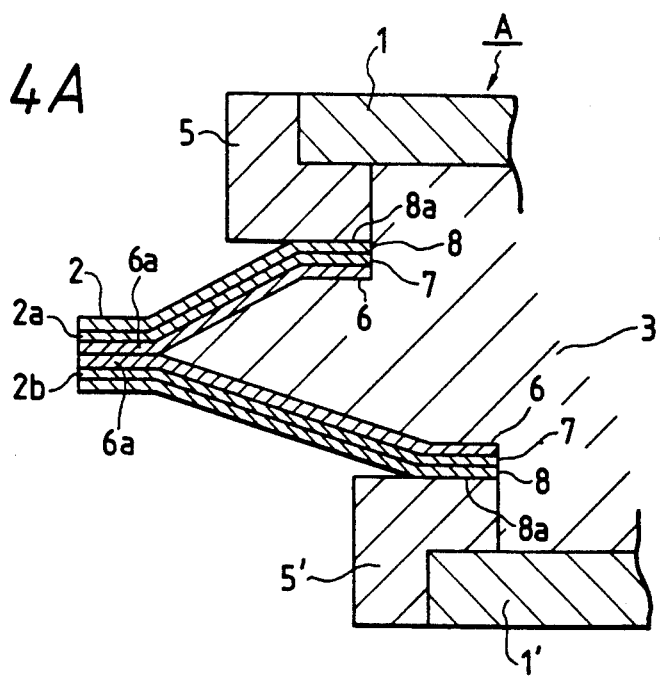
FIG. 4A is a magnified view of a part in the vicinity of a connecting member 2 shown in FIG. 2.

FIG. 4A is a partial magnified view of the vicinity of the connecting member 2 shown in FIG. 2.

As shown in FIG. 4A, the connecting member 2 is composed of members 2a, 2b, consisting of two polymer films of a three-layered structure each. Each of the members 2a, 2b is a thin laminate consisting of a thermal film adhesion layer 6 for mutually adhering the polymer films, a barrier layer 7 for protecting the material (liquid) 3 from external moisture etc. (or a support layer for preventing the heat adhesion layer from deformation), and a thermal adhesion layer 8 for adhesion with the molded support member 5.

The connecting member 2 of the first embodiment is formed, as shown in FIG. 4A, by adhering the mold adhesion layers 8, 8 positioned at the outside faces of the members 2a, 2b respectively to the support members 5, 5' at the internal peripheries 8a, 8a, and mutually adhering two annular three-layered members 2a, 2b by the film adhesion layers 6, 6 at the internal peripheries 6a, 6a thereof. Thus, the connecting member 2 is bent only by a blunt angle as shown in FIG. 3, whereby the deforming drive force for the optical device A is reduced.

In said first embodiment, the film adhesion layer 6 is preferably composed of a material which is not swelled or dissolved by the material (liquid) 3 and is capable of mutual thermal adhesion of polymer films easily at the external periphery of the connecting member 2. Examples of such material include low-density polyethylene, linear low-density polyethylene, high-density polyethylene, medium-density polyethylene, polypropylene, polyamide and polyester, and these materials are preferable as the method of thermal adhesion is a ready established. In case the enclosed material 3 is apt to swell the polymer films, there is preferably employed fluorinated films of high solvent resistance, such as of polytetrafluoroethylene, polytrifluorochloroethylene, polyfluorovinylidene, polyvinyl fluoride, tetrafluoroethylenehexafluoropropylene copolymer, ethylenetetrafluoroethylene copolymer or tetrafluoroethylene-perfluoroalkylvinylether copolymer. The thickness of the film adhesion layer 6 is preferably within a range of about 5 to 100 μm, because a thickness less than 5 μm causes deformation or thinning of the film by thermal fusion at the adhesion, whereby the desired adhesion strength cannot be obtained, while a thickness exceeding 100 μm increases the rigidity of the film, leading to an elevated deforming drive force. More preferably said thickness is maintained within a range of 20 to 60 μm.

The barrier layer 7, for preventing the moisture absorption of the material (liquid) 3, may be composed of an aluminum foil. Though aluminum foil provides complete sealing to gas and is inexpensive, the barrier property is known to be deteriorated by pinholes generated in the manufacture or in the repeated deformations. Also an aluminum foil of a thickness of 50 μm or larger is not suitable because the high rigidity increases the driving force of the optical device.

Also there may be employed a polyvinylidene chloride of good moisture resistance, an aluminum-evaporated polymer film, aforementioned fluorinated films, other metal foils, or a film with low gas permeability composed of polyvinyl alcohol or ethylene-polyvinyl alcohol copolymer. Also a film, for example of nylon, for improving the pierce strength or pinhole resistance, may be added between the barrier layer 7 and the adhesion layer 6 or 8.

If the internal liquid is little affected by moisture or air, the barrier layer 7 may be replaced by a support layer, for example of nylon, for preventing deformation of the thermal adhesion layers 6, 8 at a high temperature.

If the adhesion between the barrier layer 7 and the thermal adhesion layer 6 or 8 is not enough, there is preferably added an intermediate layer, for example of polyester, between the barrier layer 7 and the film adhesion layer 6 or the mold adhesion layer 8, in order to improve the adhesion strength and prevent the delamination resulting from swelling by the liquid 3 or from repeated bendings.

The mold adhesion layer 8 is preferably composed of a material similar to that of the support member 5, in order to improve the thermal adhesion strength. Consequently the material is determined by the dimensional precision required for the support member 5. Examples of such material include polyester, polycarbonate, polypropylene, low-density polyethylene, linear low-density polyethylene, medium-density polyethylene, high-density polyethylene, polypropylene and polyvinyl chloride. The thickness is preferably in a range of 5 to 100 μm for the same reasons as in the film adhesion layer 6, and more preferably in a range of 20 to 60 μm.

In the first embodiment, the film adhesion layer 6 and the mold adhesion layer 8 are preferably composed of films produced by casting, extrusion or inflation method.

Also in the first embodiment, the entire thickness of three layers constituting the connecting member 2 is preferably selected not exceeding 200 μm, and more preferably within a range of 10 to 100 μm for the purpose of reducing the deforming drive force.

In the embodiment shown in FIG. 4A, the connecting members 2a, 2b and the film adhesion layer 6 were composed of linear low-density polyethylene of a thickness of about 20 μm; transparent material 3 of denatured silicone oil; parallel-faced flat plates 1, 1' of glass plates; support members 5, 5' of polyethylene; barrier layer 7 of an ethylene-polyvinyl alcohol copolymer of a thickness of 10–20 μm; and mold adhesion layer 8 of linear low-density polyethylene of a thickness of about 20 μm.

The connecting member 2 may be produced by co-extrusion of three layers if the barrier layer 7 is composed of a polymer.

Figure 5:
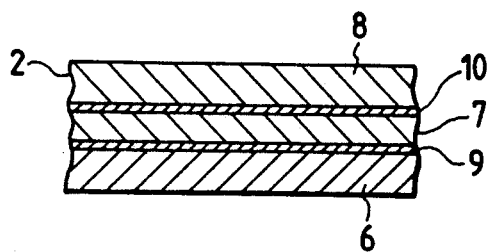
FIG. 5 is a view showing an example of producing method for the connecting member 2.

If the barrier layer 7 is composed of a metal foil or an already extended plastic film, satisfactory adhesion can be obtained for example by a dry laminate method employing adhesive materials 9, 10 as shown in FIG. 5 or an extrusion laminate method employing fused polyethylene as the adhesives 9, 10. Also the connecting member may be obtained by an inflation method capable of forming the layers 6, 7 and 8 or 6, 7, 8, 9 and 10 at a time. FIG. 5 shows an example of the producing method for the connecting member 2.

The connecting member 2 may also be composed of a general-purpose packaging film of a structure, for example, of polyester/Al/high-density polyethylene, polyester/nylon/low-density polyethylene, polyester/Al/polypropylene, polyamide/Al/high-density polyethylene, polyester/polyvinyl alcohol/polypropylene, polyamide/Al/polypropylene, linear low-density polyethylene/polyester/Al/polyester/linear low-density polyethylene, Al-evaporated linear low-density polyethylene/polyester/Al-evaporated linear low-density polyethylene, Al-evaporated linear low-density polyethylene/Al-evaporated polyester/Al-evaporated linear low-density polyethylene, Al-evaporated linear low-density polyethylene/Al-evaporated polyester/linear low-density polyethylene, linear low-density polyethylene/fluorinated film/linear low-density polyethylene, linear low-density polyethylene/polyvinylidene chloride/linear low-density polyethylene, linear low-density polyethylene/polyvinyl alcohol or ethylene-polyvinyl alcohol copolymer/linear low-density polyethylene, linear low-density polyethylene/nylon/polyvinyl alcohol or ethylene-polyvinyl alcohol copolymer/linear low-density polyethylene, or linear low-density polyethylene/nylon/linear low-density polyethylene.

In the following there will be explained a variation of the connecting member 2 employed in the first embodiment.

Figure 4B:
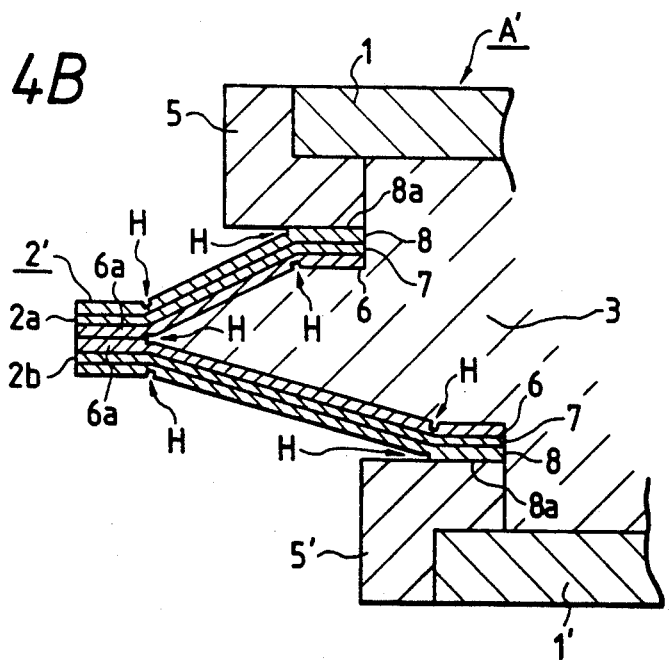
FIG. 4B is a magnified view in the vicinity of a connecting member 2' in a variation of the first embodiment.

FIG. 4B is a partial magnified view of the vicinity of a connecting member 2' constituting a variation of the first embodiment.

The optical device A' of the present variation is similar to the device A in the entire structure, but is provided with holes H for dispersing the stress, in several places subjected to stress at the extension or contraction of the connecting member 2'. Although the positions of stress will be explained later, the presence of said holes H enhances the reduction in deforming stress of the connecting member, achieved by the Y-shaped cross-sectional shape. The formation of said holes H on the film can be satisfactorily achieved by known technologies such as thermal fusion.

In the following there will be explained a second embodiment of the present invention.

Figure 6:
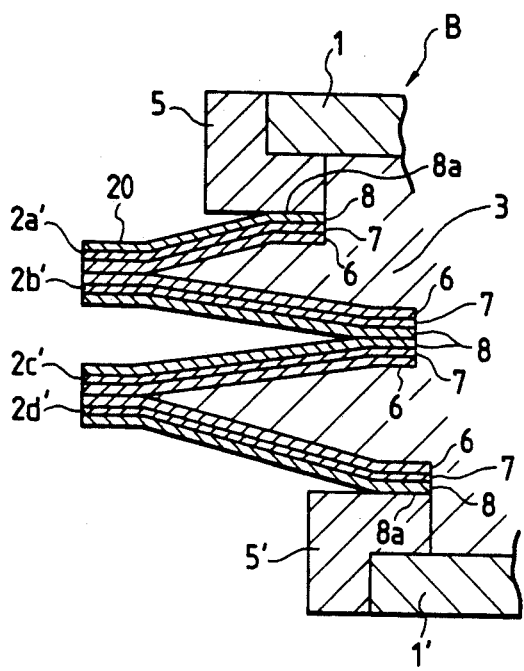
FIG. 6 is a lateral cross-sectional view of a second embodiment of the present invention.

FIG. 6 is a cross-sectional view of a second embodiment of the present invention, wherein B indicates the optical device of said second embodiment.

Difference from the aforementioned first embodiment lies in a connecting member 20 of W-shaped cross section, consisting of a two-layered structure obtained by connecting two members of Y-shaped cross section, similar to the connecting member 2, for connecting the parallel-faced flat plates 1, 1'. Said connecting member 20 is composed of elastic members 2a', 2b', 2c', 2d' each having a three-layered structure of a film adhesion layer 6, a barrier layer 7 and a mold adhesion layer 8 as in aforementioned elastic members, 2a, 2b, wherein the elastic members 2b' and 2c' are connected by mutual adhesion of the mold adhesion layers 8, 8. Also said connecting member 20 is thermally adhered, like the aforementioned connecting member 2, to the support members 5, 5' at the internal peripheries 8a, 8a of the externally positioned mold adhesion layers 8, 8. A transparent material 3 is enclosed inside the optical device B, like the device A.

As explained in the foregoing, the connecting member 20 can be composed of two connecting members each having a Y shaped cross section. Also three or more connecting members may be connected if the optical device has enough rigidity.

In the following there will be explained the difference in the required deforming stress, resulting from the difference in the shape of the connecting member for the optical device, in the aforementioned first and second embodiments and in the conventional structure.

Figure 7:
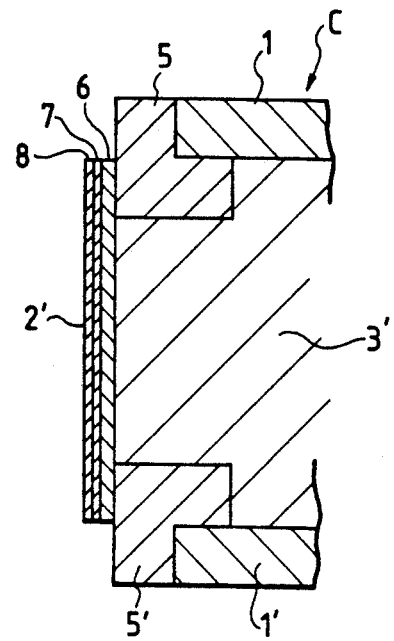
FIG. 7 is a lateral cross-sectional view of a conventional connecting member.
Figures 8, 9, 10:
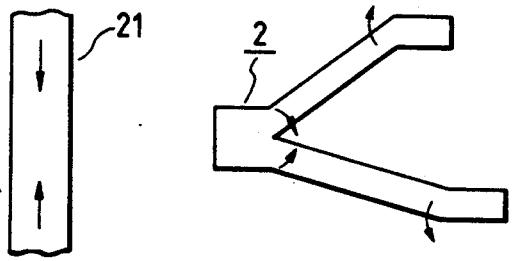
FIGS. 8 to 10 are schematic views showing the direction of deformation stress in a conventional structure and in the first and second embodiments.

FIG. 7 is a cross-sectional view of a conventional connecting member, and FIGS. 8 to 10 are views showing the directions of deforming stress in the conventional structure and in the first and second embodiments.

FIG. 7 shows a conventional optical device C, wherein a connecting member 21 composed of a flexible material such as plastics, molded in an I-shaped cross section, is thermally adhered to the peripheries of annular support members 5, 5'. When a compression deformation is generated by a biasing force applied to a part of said conventional connecting member 21, the appearing deformation stress $\sigma$ is inevitably large as the entire connecting member 21 has to be compressed as indicated by arrows, as shown in FIG. 8. On the other hand, in the connecting member 2 of the modified Y-shaped cross section as shown in FIG. 4A, the required driving force becomes very small as there is only required a small bending deformation as shown in FIG. 9. In this case the deformation stress is dispersed as indicated by arrows in FIG. 9 and each fractional stress is applied to a very small area, the required driving force for deformation becomes far smaller than that in the case of FIG. 8.

Also the connecting member 20 shown in FIG. 6, having two connecting members of Y-shaped cross section each, realizes further dispersion of the stress or strain applied to each bending part at the deformation by a biasing force, as shown in FIG. 10 in comparison with the case shown in FIG. 9, so that each fractional stress becomes smaller to reduce the required driving force. Presence of three or more connecting members of Y-shaped or modified Y-shaped cross section each will further reduce the required driving force for deformation and is therefore preferable.

In the following there will be explained the result of measurement of the required driving force, conducted on the samples of the aforementioned connecting members 21, 2 and 20.

Figure 11:
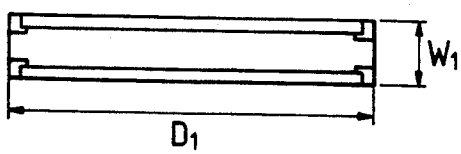
FIGS. 11 to 13 are schematic views of optical devices with different shapes of the connecting member.
Figure 12:
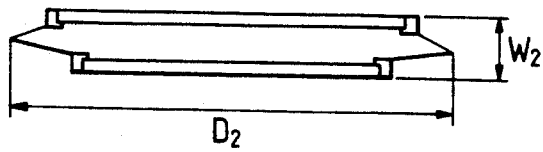
Figure 13:
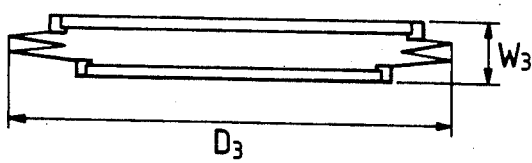

FIGS. 11 to 13 are schematic views of optical devices different in the shape of the connecting member, respectively corresponding to the devices C, A and B shown in FIGS. 7, 4A and 6. W1-W3 indicate the widths of the optical devices, and D1-D3 indicate the diameters thereof. Parameters used in the measurement were W1, W2, W3 = 10 mm, D1 = 64 mm$\phi$, D2, D3 = 74 mm$\phi$.

The connecting members 2, 20, 21 were composed of films of a thickness of 70 $\mu$m of a three-layered structure of PE (polyethylene)/EVOH (Ethylene-vinyl alcohol copolymer)/PE, and were thermally adhered to the support members 5, 5' of a diameter of 64 mm, composed of LLDPE (linear low-density polyethylene).

Figure 31A:
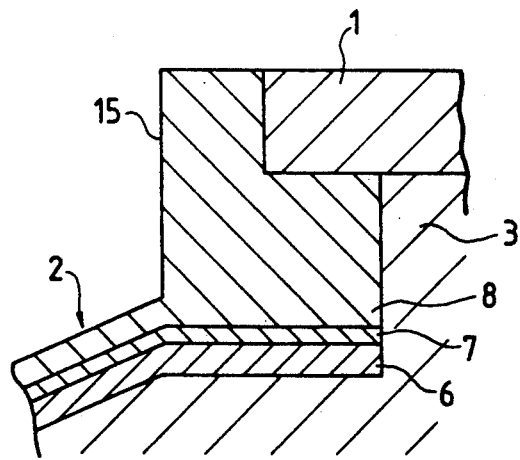
FIGS. 31A and 31B are lateral cross-sectional views showing principal parts of the optical devices respectively in 4th and 5th embodiments.
Figure 31B:
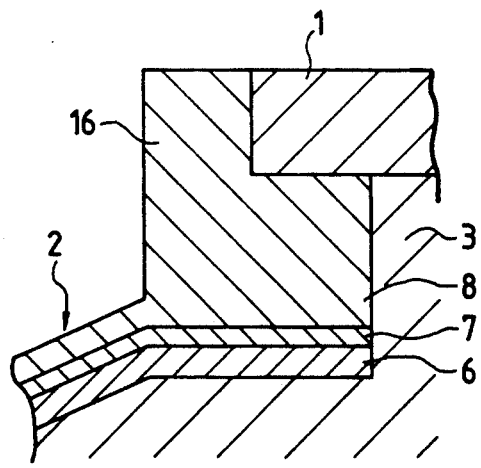
Figure 32:
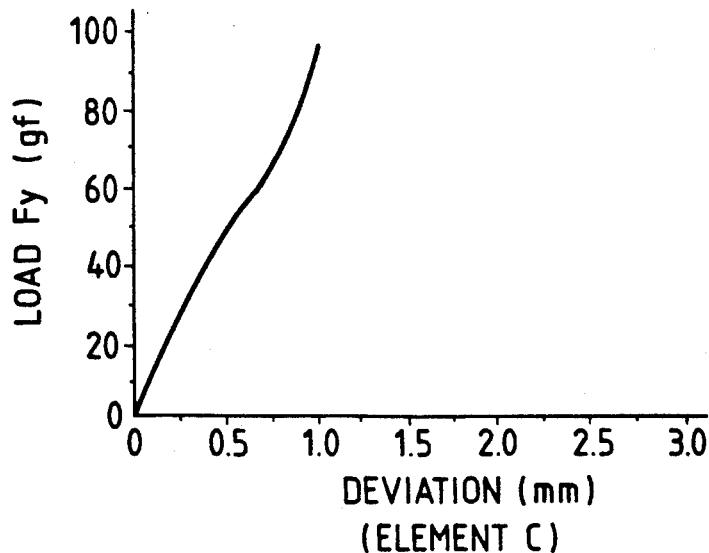
FIGS. 32 to 34 are charts showing relationship between deviation and load Fy required as the deforming force, averaged over seven samples on each of the optical devices C, A and B.
Figure 33:
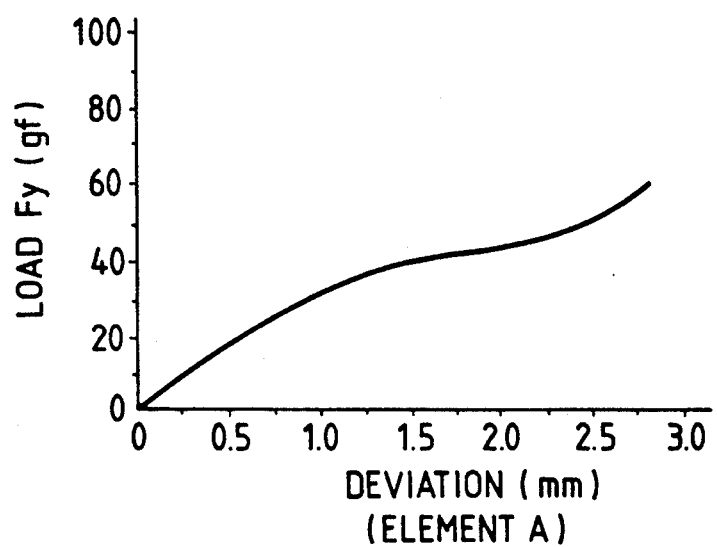
Figure 34:
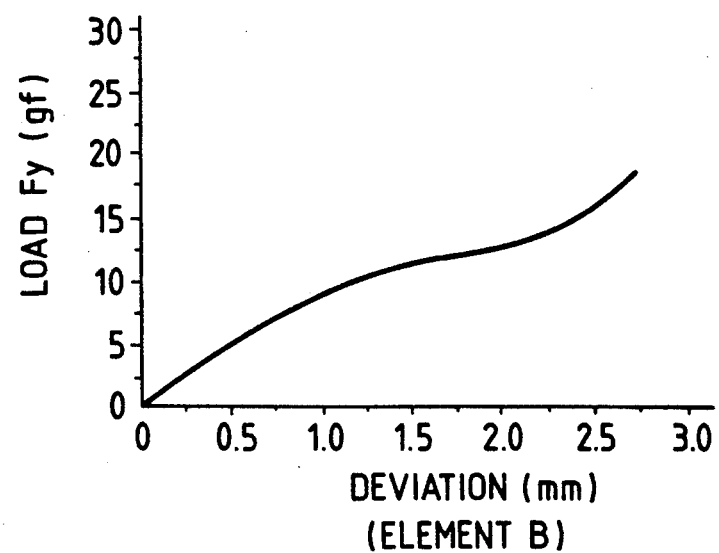

FIGS. 31 to 33 are charts showing the relationship between the deviation in mm and the load Fy in gram force (gf) required for the deformation driving force, averaged over seven samples of each of the devices C, A and B. Comparison of FIGS. 31 to 33 indicates that Fy = 57 (gf) required for the device C is reduced by 88% to Fy = 11 (gf) in the device A and by 89% to Fy = 6 (gf) in the device B. These results indicate that the driving force required for deformation decreases with the increase in the number of the connecting members with Y-shaped cross section.

As explained in the foregoing, the second embodiment allows to further reduce the required driving force in comparison with the first embodiment, by the increase in the number of connecting members of Y-shaped cross section employed in said first embodiment.

In the following there will be explained the producing method of the optical device, taking the connecting member 20 of the second embodiment as an example.

FIGS. 14 to 24 illustrate the producing method for the optical device B of the second embodiment.

Figure 14:
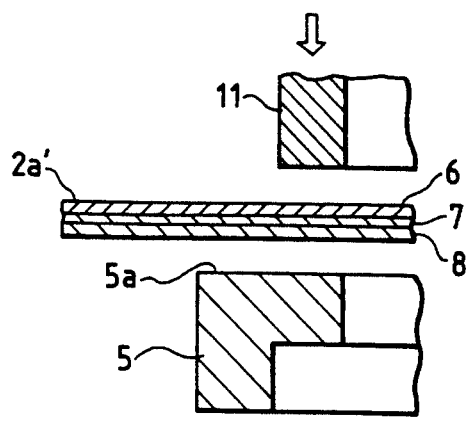
FIGS. 14 to 24 are views showing the producing method for the optical device B of the second embodiment.
Figure 15:
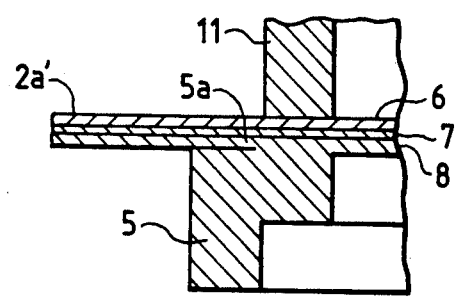

At first an annular support member 5 of L-shaped cross section, molded or worked with a sufficient precision, is prepared, and a member 2a' (three-layered laminate film consisting of a film adhesion layer 6, a barrier layer 7 and a mold adhesion layer 8) for constituting the connecting member 2 is positioned, as shown in FIG. 14, above an adhesion face 5a of the support member 5, in such a manner that said support member 5 faces the mold adhesion layer 8, similar in material to said support member, of the elastic member 2a'. Then a cylindrical thermal adhesion apparatus 11 positioned above is moved as indicated by an arrow in FIG. 14, whereby a part of the adhesion face 5a of the support member 5 is adhered by thermal fusion to the mold adhesion layer 8 under pressure contact. Said thermal adhesion apparatus 11 can for example be a heat press employing a metal jig of good thermal conductivity such as of aluminum, copper or brass, an impulse sealer employing an instantaneous heat-generating member by current supply, an ultrasonic welder utilizing small vibration and pressure, or a high frequency induction heater. An optimum apparatus can be selected, within the scope of the present invention, in consideration of the used materials, shape, productivity and cost.

Figure 16:
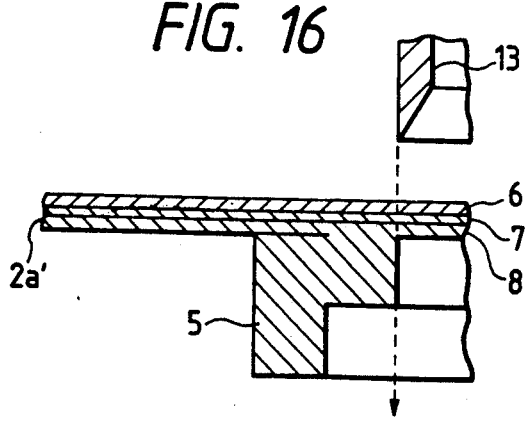
Figure 17:
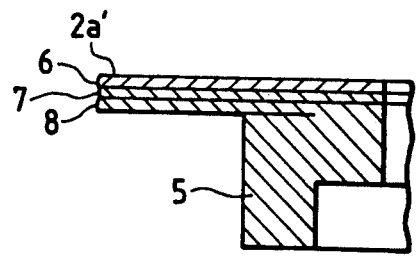

Then, as shown in FIG. 16, a cylindrical cutter 13 is positioned above for cutting the internal periphery of the elastic member 2a', and the elastic member 2a' is cut along a broken-lined arrow, whereby the internal periphery of the elastic member 2a' coincides with that of the support member 5 as shown in FIG. 17. The cutter 13 can be of any type, such as a shearing cutter utilized in the press punching, or a cutter blade made of steel.

Also an intermediate component is prepared from a support member 5" of a different diameter and an elastic member 2d'.

Figure 18:
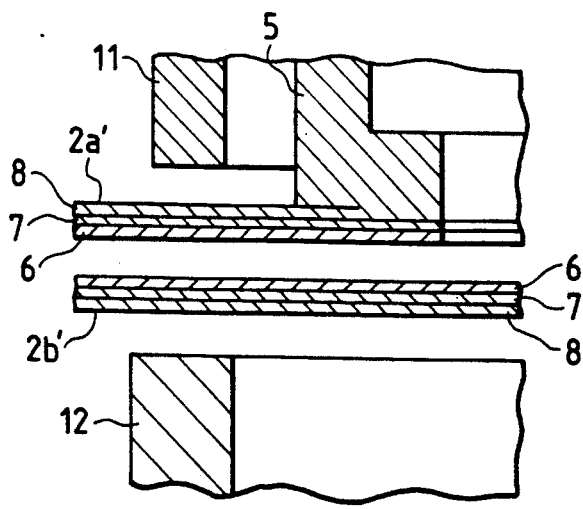
Figure 19:
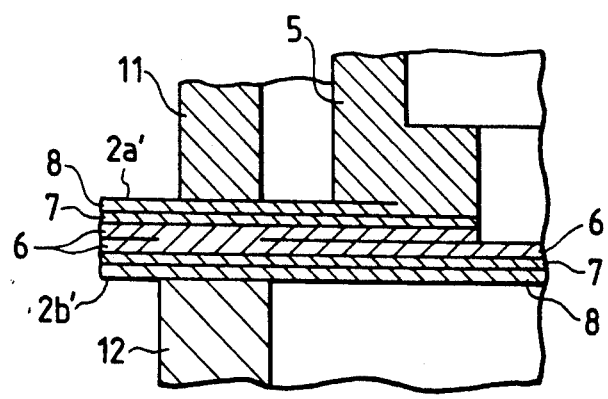

Then the intermediate component obtained in the step shown in FIG. 17 is positioned opposite to the adhesion layer 6 of the elastic member 2b' as shown in FIG. 18, and the thermal adhesion apparatus 11 and a cylindrical retainer 12 are positioned in mutually opposed manner, outside the external periphery of the support member 5. Then, as shown in FIG. 19, the two laminate film members 2a', 2b' are thermally adhered in a part (pressed between the thermal adhesion apparatus 11 and the cylindrical retainer 12) of the mutually opposed film adhesion layers 6, 6. The retainer 12 is composed of a metal overcoated or laminated with rubber or teflon and is used as an auxiliary table for evenly and efficiently applying the pressure of the thermal adhesion apparatus 11 to the films.

Another intermediate component is obtained by similarly adhering elastic members 2c', 2d'.

Figure 20:
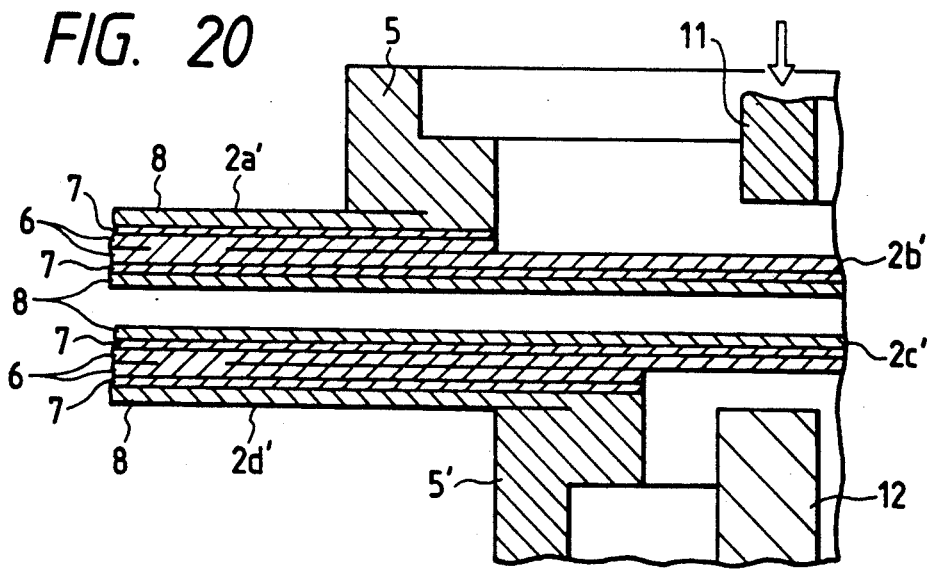
Figure 21:
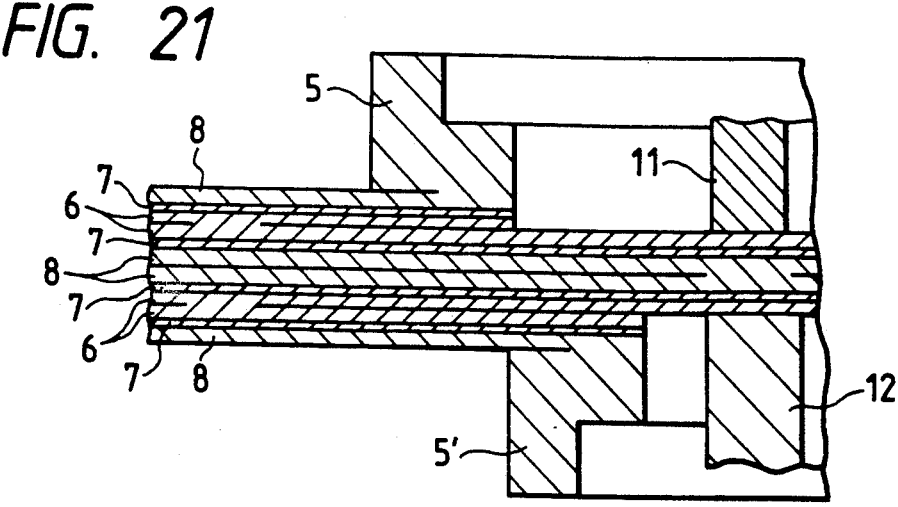

Next prepared are two intermediate components obtained in the step of FIG. 19, one being composed of the support member 5 and elastic members 2a', 2b' as explained in FIGS. 14 to 19, while the other being composed of a support member 5' and elastic members 2c', 2d' not shown in the drawings. Said two intermediate components are so positioned, as shown in FIG. 20, that the mold adhesion layers 8, 8 of the elastic members 2b', 2c' face mutually, and the thermal adhesion apparatus 11 and the retainer 12 are positioned inside the internal periphery of the support member 5. Then, as shown in FIG. 21, the two laminate film members 2b', 2c' are thermally adhered in a part (pressed between the thermal adhesion apparatus 11 and the retainer 12) of the mold adhesion layers 8, 8.

Figure 22:
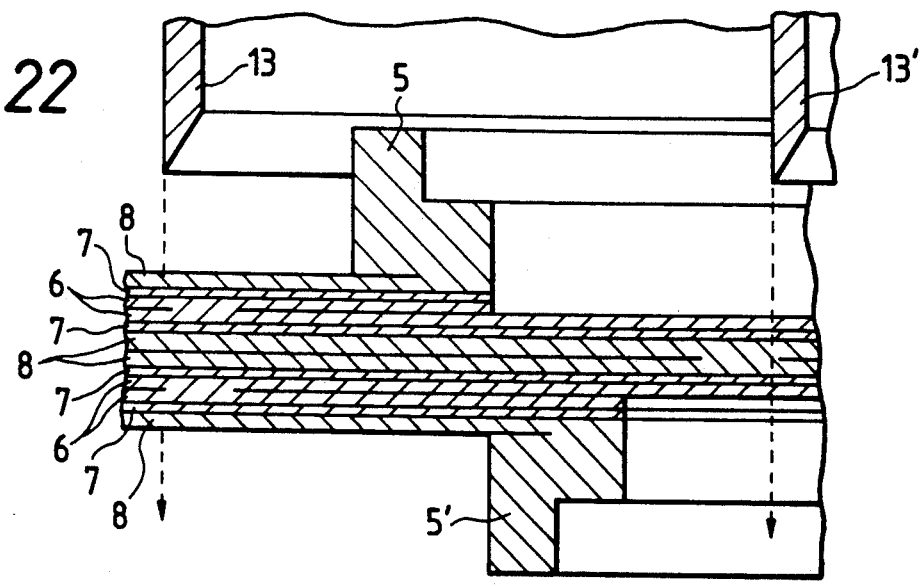
Figure 23:
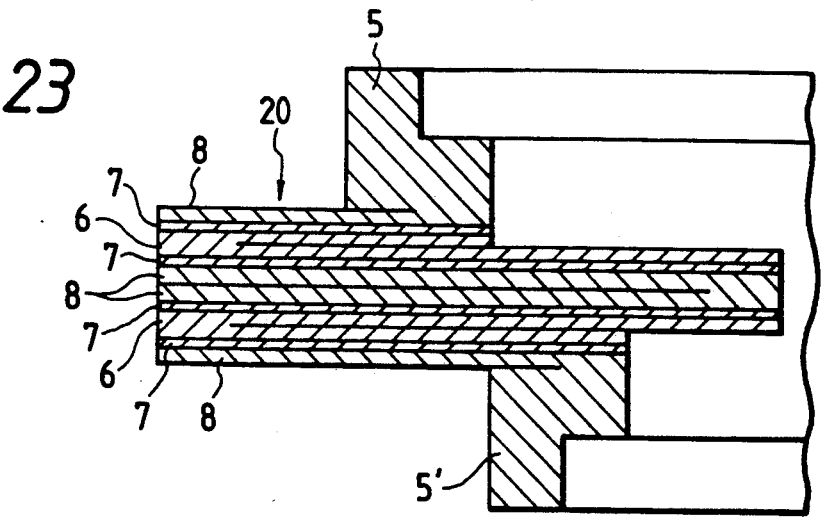

Subsequently, as shown in FIG. 22 cutter 13 is moved along a broken-lined arrow to cut the inside of the annular adhered portion shown in FIG. 21. Thus, as shown in FIG. 23, the two intermediate components mentioned above are integrally connected, thereby forming the connecting member 20 of a bellows structure.

Figure 24:
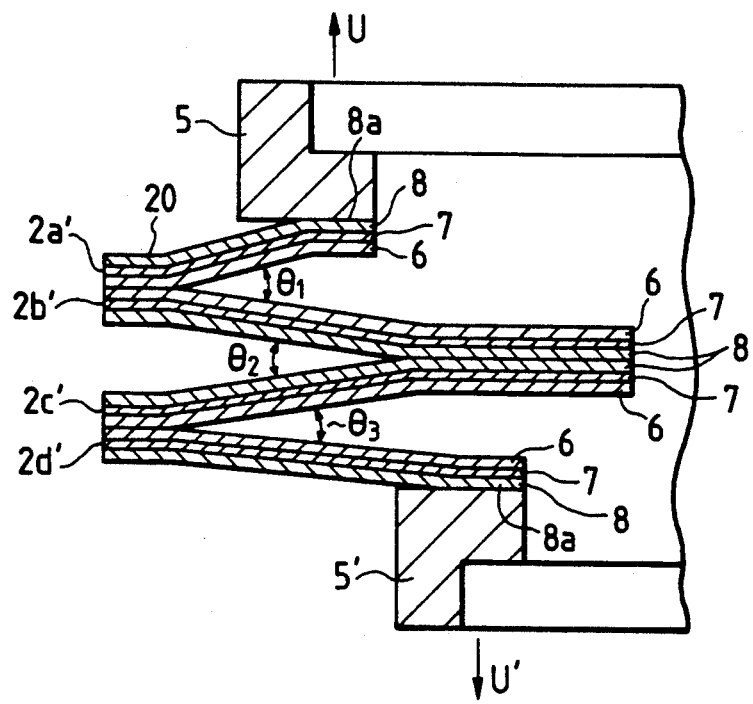

Then, as shown in FIG. 24, the elastic members 2a'-2d' constituting the integrated intermediate components are spread in directions U, U' to the fixed positions of parallel-faced flat plates 1, 1', in order to provide the connections of the elastic members 2a'-2d' with angles $\theta_1$-$\theta_3$. Thus the connecting member 20 is given the Y-shaped cross sections. Said flat plates 1, 1' are positioned in advance with a predetermined reference distance therebetween, but each plate is supported at only one point so as to maintain said reference distance. Thus, if the edges of the flat plates 1, 1' are pinched at a point, the distance of said plates is reduced at such pinched position and increases at a point-symmetric position with respect to the center of said plates 1, 1'. In this manner c the distance between the flat plates 1, 1' is variable except in the fixed support point of said plates.

Subsequently the parallel-faced flat plates 1, 1' are adhered with resinous or rubber adhesive, and, after the hardening of the adhesive, absence of leakage is confirmed with a helium leak tester. (Said helium leak tester measures the leaking amount of helium, by filling helium gas in the enclosed films and applying an external pressure on said films.) Upon completion of said confirmation, the transparent material 3 is filled through an inlet formed in the resin or in the film, and said inlet is subsequently sealed by fusion or adhesion. Thus the optical device is completed as shown in FIG. 6.

The above-explained producing method improves the reliability of adhesion of the connecting member and simplifies the procedure, by adhering the connecting member, for varying the vertical angle of two parallel-faced flat plates, by thermal fusion.

In the following there will be explained variations of the optical device B of the 2nd embodiment, with reference to cross-sectional views in FIGS. 25 to 28.

Figure 25:
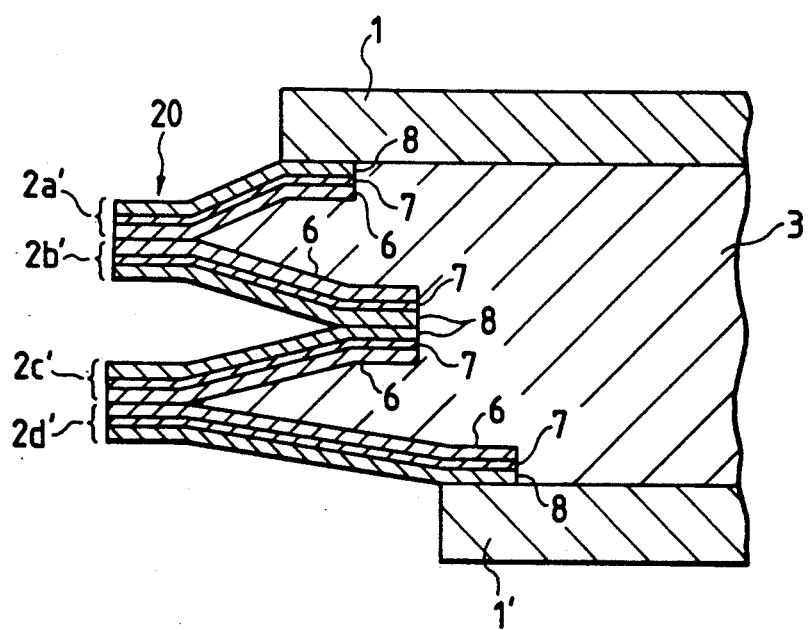
FIGS. 25 to 28 are lateral cross-sectional views showing variations of the optical device B.

FIG. 25 shows a first variation. Parallel-faced flat plates 1, 1' are composed of a transparent plastic material, such as polycarbonate, and a same material is employed in the elastic members 2a-2d' of the connecting member 20. Use of a same material, for example a polycarbonate film in the mold adhesion layer 8 of the laminate film enables direct adhesion of the flat plates 1, 1' with the mold adhesion layers 8, 8' of the elastic members 2a, 2d', dispensing with the support members 5, 5' for supporting said flat plates 1, 1'.

The present first variation thus enables to reduce the number of component parts of the optical device, thereby contributing to improvement in efficiency and simplification of the work.

Figure 26:
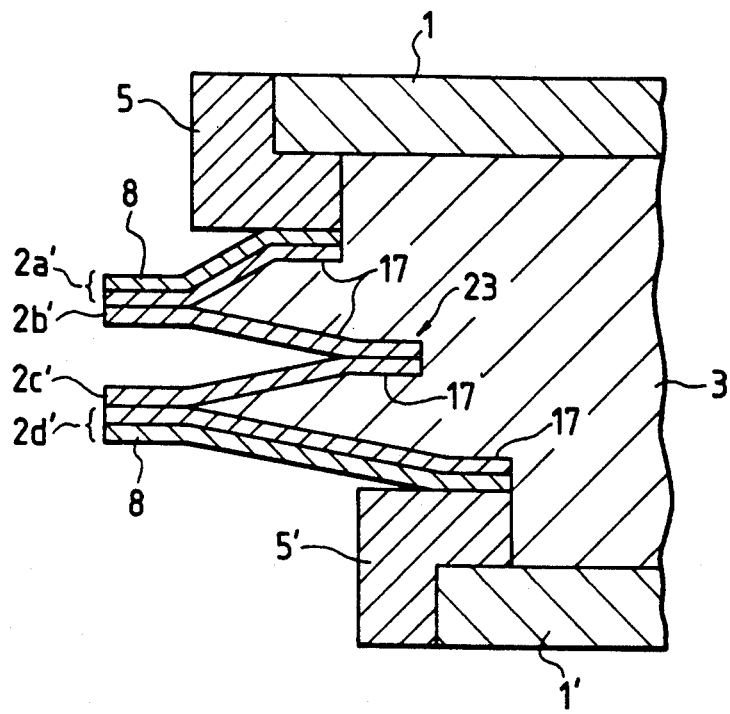

FIG. 26 shows a second variation, in which the connecting member 23 is composed of a film 17, composed for example of a fluorinated film with improved vapor barrier property and capable of adhesion by thermal fusion, thereby serving as the film adhesion layer 6 and the barrier layer 7. Examples of the material for said film 17 includes CTFE (polychlorotrifluoroethane), FEP (polyperfluoroethylene-propylene), PVDF (polyvinylidene fluoride) and PVDC (polyvinylidene chloride). The entire optical device can be simplified in structure, by constituting the elastic members 2a' and 2d' by a two-layered structure of the film 17 and a mold adhesion layer 8, and the elastic members 2b' and 2c' by the film 17.

Figure 27:
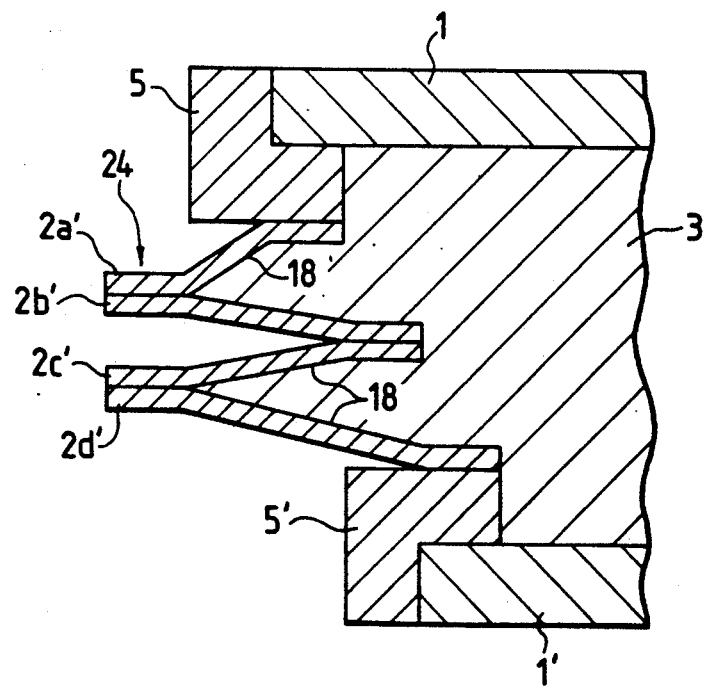

FIG. 27 shows a third variation in which each of the elastic members 2a'-2d' constituting the connecting member 24 is composed of a single-layered polymer film 18, which can be composed, for example, of polyester, polyamide, polycarbonate or polyethylene.

This third variation can further simplify the structure of the optical device in comparison with the second variation.

Figure 28:
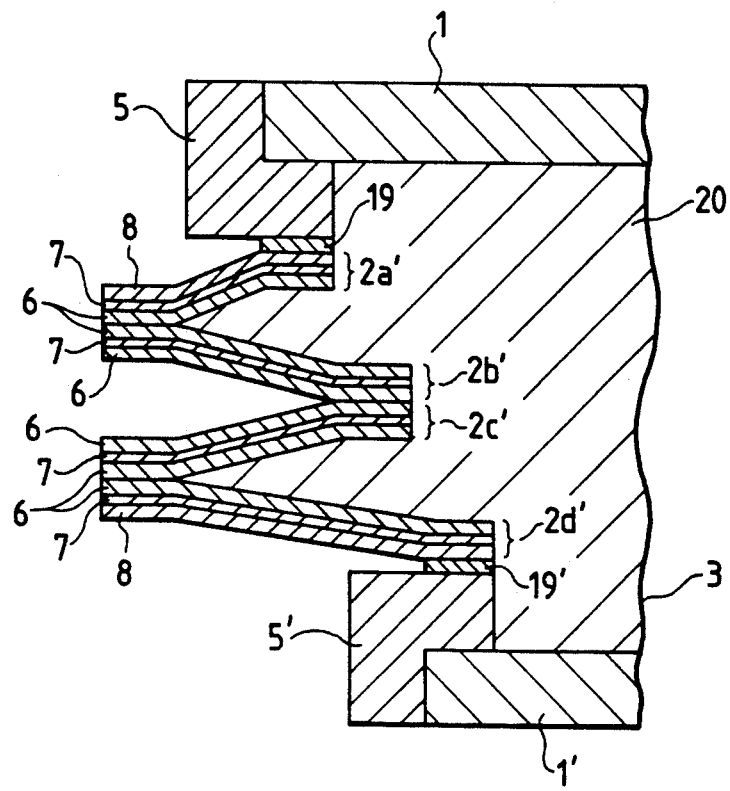

FIG. 28 shows a fourth variation.

In the foregoing variations, the support members 5, 5' may be composed of metal if they have reference faces for the positional precision of the optical device and therefore require a high precision. In such case, the connecting member 20 may be adhered for example as shown in FIG. 28, by inserting a different material capable of thermal adhesion, such as hot-melt films 19, 19' between the mold adhesion layers 8, 8 of the elastic members 2a', 2d' and the metal support members 5, 5'.

Also ordinary liquid adhesive may be used for this purpose, and such adhesion is effective for improving the positional precision of the optical device.

Thus the fourth variation enables easy connection of the connecting member, regardless of the material constituting the support members 5, 5'.

The foregoing first to fourth variations are applicable to the connecting member with only one Y-shaped cross section as in the optical device A, and also to the optical devices with the connecting members of plural layers of Y-shaped cross section.

Figure 29:
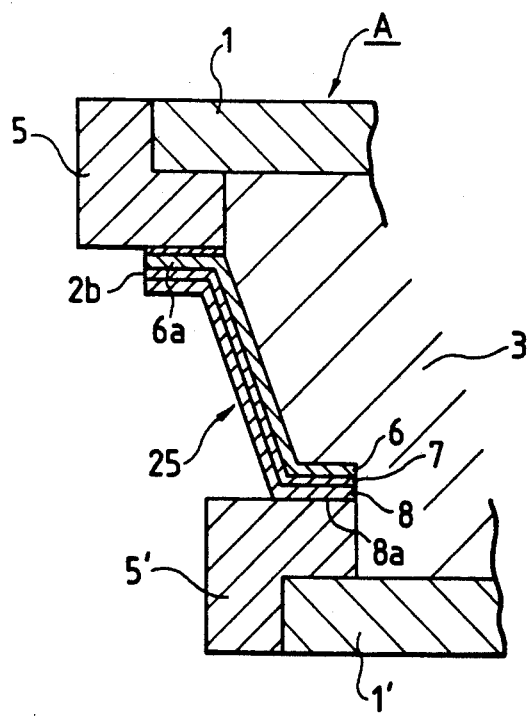
FIG. 29 is a lateral cross-sectional view showing principal parts of the optical device of a 3rd embodiment.

In the following there will be explained a third embodiment of the present invention with reference to FIG. 29, which is a lateral cross-sectional view of the principal parts of an optical device of said embodiment.

Said third embodiment is similar to the first embodiment in structure, except that the support members 5, 5' are connected by a connecting member without any Y-shaped or modified Y-shaped cross section, and such structure without Y-shaped or modified Y-shaped cross section can still provide the same effects in the performance of the optical device or in the producing method therefor, as in the first embodiment.

Figure 30A:
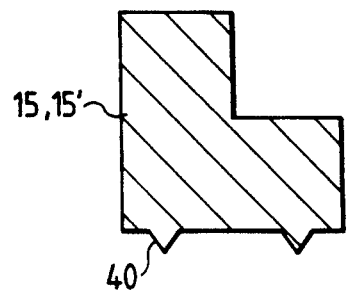
FIGS. 30A and 30B are lateral cross-sectional views showing principal parts of a support member in 4th and 5th embodiments.
Figure 30B:
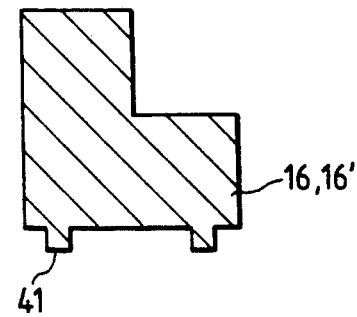

In the following there will be explained 4th and 5th embodiments of the present invention, with reference to FIGS. 30A and 30B which are cross-sectional views showing the principal parts of support members in said embodiments, and FIGS. 31A and 31B which are cross-sectional views showing the principal parts of the optical devices of said embodiments.

Support members 15, 15' and 16, 16', similar in material to those 5, 5' in the first and second embodiments, are provided with projections 40 of triangular cross section or those 41 of rectangular cross section, on the faces to be adhered to the mold adhesion layers 8, 8 of the connecting member 2. Said projection 40 or 41 may be provided in one to three positions as energy director.

The above-explained 4th and 5th embodiments create concentrated pressure in thermal adhesion, thereby avoiding uneven pressure and ensuring the adhesion work, thus improving the reliability of the optical device. Naturally these embodiments are applicable to a connecting member having plural layers of Y-shaped cross sections, as in the 2nd embodiment.

The above-explained 1st to 5th embodiments have been explained by disc-shaped optical devices, but the present invention is not limited to such devices and is applicable for example to rectangular devices as long as they are within the scope of the appended claims. Such rectangular optical devices are convenient as they can be matched with the image angle (image frame) of an optical instrument, such as a view finder of a camera, if it is also rectangular.

Also, in other embodiments than the first one, the holes H may naturally be provided, as in the optical device A' shown in FIG. 4B, at positions to be subjected to deformation stress.

As explained in the foregoing, the present invention enables not only to easily vary the mutual angle of two opposed parallel-faced flat plates with a small driving force thereby regulating the optical properties of the optical device, but also to select different shapes and radial dimensions for said two flat plates and to vary shape and dimension of the connecting member, thereby reducing the dimension and weight of the entire structure of the optical device.

Also the reduced driving force required for the optical device allows to reduce the drive source or power source of the equipment in which said optical device is to be incorporated. For example, the optical device of the present invention may be incorporated into a compact camera in which the vibration compensating optical system could not be employed in the past.

Furthermore, the complete vapor barrier property achieved by the use of aluminum foil, evaporated aluminum layer, chlorinated or fluorinated film in a part of the films constituting the connecting member allows to prevent contamination of the internal liquid with water vapor. Thus said internal liquid is protected from fluctuation in refractive index or loss of transmittance, so that the optical device can be effectively protected from deterioration of the optical performance.

Furthermore, the adhesion of the connecting member by thermal fusion improves the reliability of said adhesion and simplifies the production process.

Figure 35:
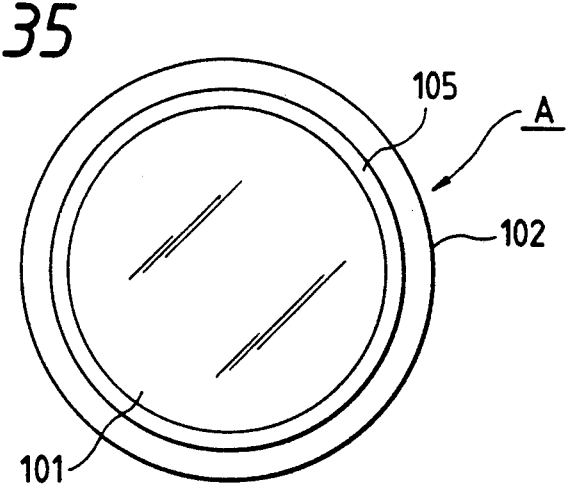
FIG. 35 is a plan view showing principal parts of a 6th embodiment of the present invention.
Figure 36:
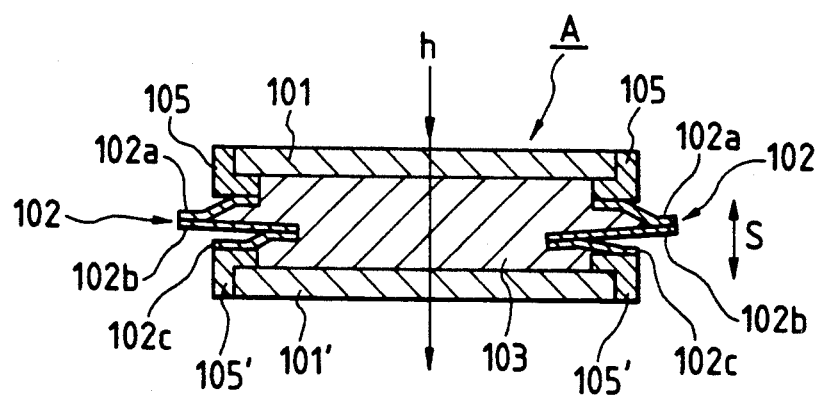
FIG. 36 is a lateral cross-sectional view of the embodiment shown in FIG. 35.

FIGS. 35 and 36 are respectively a plan view and a lateral cross-sectional view of principal parts of a 6th embodiment.

In FIGS. 35 and 36, there is shown a cylindrical optical device A constituting the 6th embodiment. Said device A is composed of a pair of optically transparent, disc-shaped, parallel-faced flat plates 101, 101' connected with an annular connecting member 102 with a Y-shaped cross section and enclosing therein an optically transparent material 103 such as liquid or silicone rubber, wherein the parallel-faced flat plates 101, 101' are respectively supported by annular support members 105, 105' of an L-shaped cross section provided between said flat plates 101, 101' and the connecting member 102. The optical device A functions as a variable-angle prism member in which the angle (degree of parallelism) of the paired flat plates 101, 101' is varied by an external biasing force, thereby arbitrarily varying the optical properties of the passing light beam.

The components of the optical device A will be explained in further detail in the following.

The parallel-faced flat plates 101, 101' are composed for example of a plastic material or glass, and are positioned substantially parallel in the absence of the external biasing force, as shown in FIG. 36. The connecting member 2 is an elastic member with a Z-shaped cross section, or of a bellows structure, composed of mutually laminated two annular members 102a, 102b having flexibility and softness such as polymer films or aluminum foils, and is so constructed as to arbitrarily vary the width in a direction S shown in FIG. 36. In the illustrated example, the connecting member 102 of bellows structure has two peak portions. Also the connecting member 102 is so constructed as to have a portion, in an area of the external periphery of the flat plates 101, 101', where the thickness or lateral length of the members 102a, 102b is constant or partially different.

Examples of the optically transparent material 103 includes water, alcohol, glycol, silicone oil, denatured silicone oil, silicone rubber and fluorinated oils. The support members 105, 105' are composed for example of a molded plastic material of a high hardness with an L-shaped cross section as shown in FIG. 36, and support the flat plates 101, 101' by surrounding the periphery thereof. Also use of a composite material obtained by insertion molding of a metal material such as aluminum or stainless steel, or a composite material obtained by comolding or adhesion of another plastic material such as glass-reinforced polyester is preferable for increasing the rigidity of the support members 105, 105'.

The support members 105, 105' and the corresponding flat plates 101, 101' are adhered by a thermoplastic or thermosetting adhesive showing excellent adhesive power and not influenced for example by swelling or dissolution by the internal liquid 103, such as epoxy, polyamide, polyimide, cyanoacrylate, olefinphenolic, urethane, silicone or halogenated adhesive.

Also rubber adhesives such as NBR (synthetic rubber composed of butadiene-acrylonitrile copolymer), SBR (synthetic rubber composed of butadiene-styrene copolymer), silicone rubber of halogenated rubbers such as fluorinated rubber, are preferred because they are capable of absorbing strains resulting from hardening or shrinkage after adhesion, or from difference in physical properties such as in the expansion coefficient or hardness, between the support members 105, 105' and the flat plates 101, 101'.

Further, silicone and fluorinated adhesives are particularly preferred because of their excellent resistance to solvents and weathering.

In the following there will be explained the function of the 6th embodiment.

In the absence of external force to the optical device A, as shown in FIG. 36, the two parallel-faced flat plates 101, 101' are maintained substantially parallel, with a mutual angle almost zero, whereby an incident light h linearly passes through the flat plates 101, 101' of the optical device A.

Figure 37:
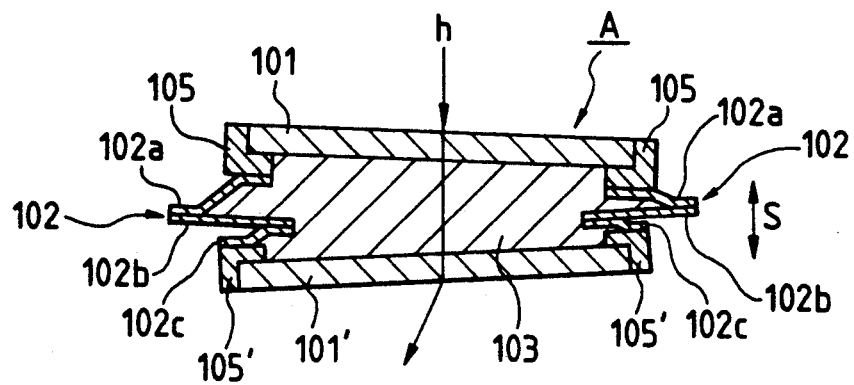
FIG. 37 is a view showing the state when a biasing force is applied to a part of the periphery of the optical device A shown in FIG. 36.

FIG. 37 is a schematic view of the optical device A when a biasing force is applied to a part of the periphery.

Under the external biasing force, the angle of two flat plates 101, 101' varies to a certain magnitude, whereby the optical device A functions as a variable-angle prism member. Thus a light beam h entering the device A from the flat plate 101 is refracted at the flat plate 101', and emerges from the device in a deflected state. Since the material 103 (for example liquid) has a constant volume, the members 102a, 102b, 102c constituting the connecting members 102 extend at the left side but contract at the right side in a direction S as shown in FIG. 37, whereby the entire device A deforms as a prism.

In the application of the optical device A for example in the phototaking system of a photographic camera or a video camera, the biasing force required for deforming the material 103 (for example liquid) is negligibly small unless the driving speed is very high. Consequently the driving force required to deform the optical device A is practically determined by the deformation stress of the connecting member 102.

Thus, in this 6th embodiment, the driving force required for deforming the optical device A can be minimized by suitable selection of the material and shape of the connecting member 102.

Figure 38A:
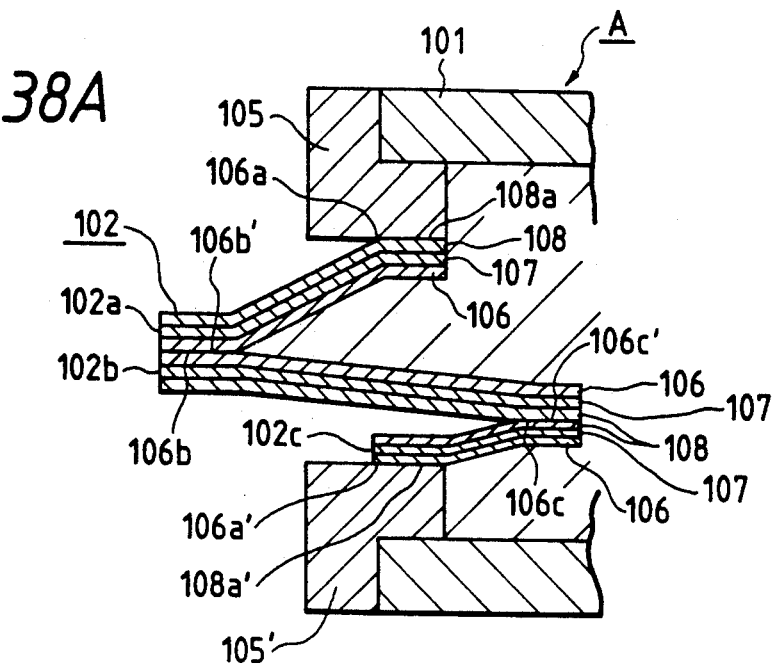
FIG. 38A is a magnified view of a part in the vicinity of a connecting member 102 shown in FIG. 36.

FIG. 38A is a partial magnified view of the vicinity of the connecting member 102 shown in FIG. 36.

As shown in FIG. 38A, the connecting member 102 is composed of thin polymer film members 102a, 102b, 102c of a three-layered structure each. Each of the members 102a, 102b, 102c is a thin laminate consisting of a film adhesion layer 106 for mutually thermally adhering the polymer films, a barrier layer 107 for protecting the material (liquid) 103 from external moisture etc. (or a support layer for preventing the adhesion layers from deformation), and a mold adhesion layer 108 for thermal adhesion with the molded support member 105.

The connecting member 102 of the 6th embodiment is formed, as shown in FIG. 38A, by two annular three-layered members 102a, 102c which are fixed to the support members 105, 105' by fusing the adhesion layers 106a, 106a' to externally positioned mold adhesion layers 108a, 108a', then by fixing said member 102a to another member 102b through the adhesion layers 106b, 106b' and by fixing said member 102c to the another member 102b through the adhesion layers 106c, 106c'.

Thus, the connecting member 102 is bent only by a blunt angle as shown in FIG. 37, whereby the driving force required for deforming the optical device A is reduced.

In the 6th embodiment, the film adhesion layer 106 is preferably composed of a material which is not swelled or dissolved by the material (liquid) 103 and is capable of mutual thermal adhesion of polymer films easily at the external periphery of the connecting member 102. Examples of such material include low-density polyethylene, linear low-density polyethylene, high-density polyethylene, medium-density polyethylene, polypropylene, polyamide and polyester, and these materials are preferable as the method thermal adhesion is already established. In case the enclosed material 103 is apt to swell the polymer films, there is preferably employed fluorinated films of high solvent resistance, such as of polytetrafluoroethylene, polytrifluorochloroethylene, polyfluorovinylidene, polyvinyl fluoride, tetrafluoroethylenehexafluoropropylene copolymer, ethylene-tetrafluoroethylene copolymer or tetrafluoroethylene-perfluoroalkylvinylether copolymer. The thickness of the film adhesion layer 106 is preferably within a range of about 5 to 100 μm, because a thickness less than 5 μm causes deformation or thinning of the film by thermal fusion at the adhesion, whereby the desired adhesion strength cannot be obtained, while a thickness exceeding 100 μm increases the rigidity of the film, leading to an elevated deforming drive force. More preferably said thickness is maintained within a range of 20 to 60 μm.

The barrier layer 7, for preventing the moisture absorption of the material (liquid) 103, may be composed of an aluminum foil. Though aluminum foil provides complete sealing to gas and is inexpensive, the barrier property is known to be deteriorated by pinholes generated in the manufacture or in the repeated deformations. Also an aluminum foil of a thickness of 50 μm or larger is not suitable because the high rigidity increases the drive force of the optical device.

Also there may be employed a polyvinylidene chloride of good moisture resistance, an aluminum-evaporated polymer film, aforementioned fluorinated films, other metal foils, or a film with low gas permeability composed of polyvinyl alcohol or ethylene-polyvinyl alcohol copolymer. Also a film, for example of nylon, for improving the pierce strength of pinhole resistance, may be added between the barrier layer 107 and the adhesion layer 106 or 108.

If the internal liquid is little affected by moisture or air, the barrier layer 107 may be replaced by a support layer, for example of nylon, for preventing deformation of the thermal adhesion layers 106, 108 at a high temperature.

If the adhesion between the barrier layer 107 and the thermal adhesion layer 106 or 108 is not enough, there is preferably added an intermediate layer, for example of polyester, between the barrier layer 107 and the film adhesion layer 106 or the mold adhesion layer 108, in order to improve the adhesion strength and prevent the delamination resulting from swelling by the liquid 103 or from repeated bendings.

The mold adhesion layer 108 is preferably composed of a material similar to that of the support member 105, in order to improve the thermal adhesion strength. Consequently the material is determined by the dimensional precision required for the support member 105. Examples of such material include polyester, polyamide, polycarbonate, polypropylene, low-density polyethylene, linear low-density polyethylene, medium-density polyethylene, high-density polyethylene, polypropylene and polyvinyl chloride. The thickness is preferably in a range of 5 to 100 μm for the same reasons as for the film adhesion layer 106, and more preferably in a range of 20 to 60 μm.

In the 6th embodiment, the film adhesion layer 106 and the mold adhesion layer 108 are preferably composed of films produced by casting, extrusion or inflation method.

Also in this 6th embodiment, the entire thickness if three layers constituting the connecting member 102 is preferably selected not exceeding 200 μm, and more preferably within a range of 10 to 100 μm for the purpose of reducing the driving force for deformation.

The connecting member 102 may be produced by co-extrusion of three layers if the barrier layer 107 is composed of a polymer.

Figure 39:
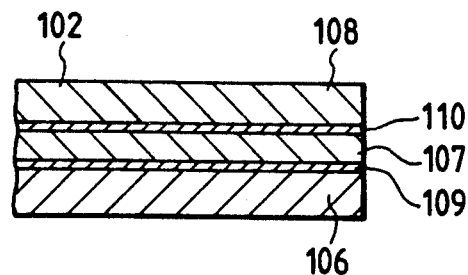
FIG. 39 is a view showing an example of producing method for the connecting member 102.

If the barrier layer 107 is composed of a metal foil or an already extended plastic film, satisfactory adhesion can be obtained for example by a dry laminate method employing adhesive materials 109, 110 as shown in FIG. 39, or an extrusion laminate method employing fused polyethylene as adhesives 109, 110. Also the connecting member may be obtained by an inflation method capable of forming the layers 106, 107 and 108, or 106, 107, 108, 109 and 110 at a time. FIG. 39 shows an example of the producing method for the connecting member 102.

The connecting member 102 may also be composed of a general-purpose packaging film of a structure, for example, of polyester/Al/high-density polyethylene, polyester/nylon/low-density polyethylene, polyester/Al/polypropylene, polyamide/Al/high-density polyethylene, polyester/polyvinyl alcohol/polypropylene, polyamide/Al/polypropylene, linear low-density polyethylene/polyester/Al/polyester/linear low-density polyethylene, Al-evaporated linear low-density polyethylene/polyester/Al-evaporated linear low-density polyethylene, Al-evaporated linear low-density polyethylene/Al-evaporated polyester/Al-evaporated linear low-density polyethylene, Al-evaporated linear low-density polyethylene/Al-evaporated polyester/linear low-density polyethylene, linear low-density polyethylene/fluorinated film/linear low-density polyethylene, linear low-density polyethylene/polyvinylidene chloride/linear low-density polyethylene, linear low-density polyethylene/polyvinyl alcohol or ethylene-polyvinyl alcohol copolymer/linear low-density polyethylene, linear low-density polyethylene/nylon/polyvinyl alcohol or ethylene-polyvinyl alcohol copolymer/linear low-density polyethylene, or linear low-density polyethylene/nylon/linear low-density polyethylene.

In the following there will be explained a variation of the connecting member 102 employed in the 6th embodiment.

Figure 38B:
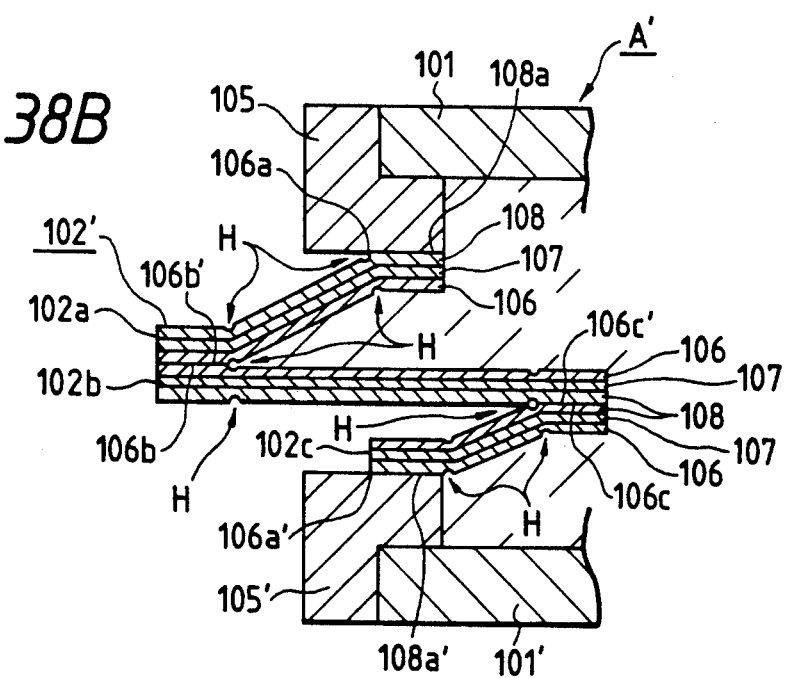
FIG. 38B is a magnified view in the vicinity of a connecting member 102' in a variation of the 6th embodiment.

FIG. 38B is a partial magnified view of the vicinity of a connecting member 102' constituting a variation of the 6th embodiment.

The optical device A' of the present variation is similar to the device A in the entire structure, but is provided with holes H for dispersing the stress, in several places subjected to stress at the expansion or shrinkage of the connecting member 102'. Although the positions of such stress will be explained later, the presence of said holes H enhances the reduction in deforming stress of the connecting member, achieved by the Z-shaped cross-sectional structure. The formation of such holes H on the film can be satisfactorily achieved by known technologies such as thermal fusion.

Figure 40:
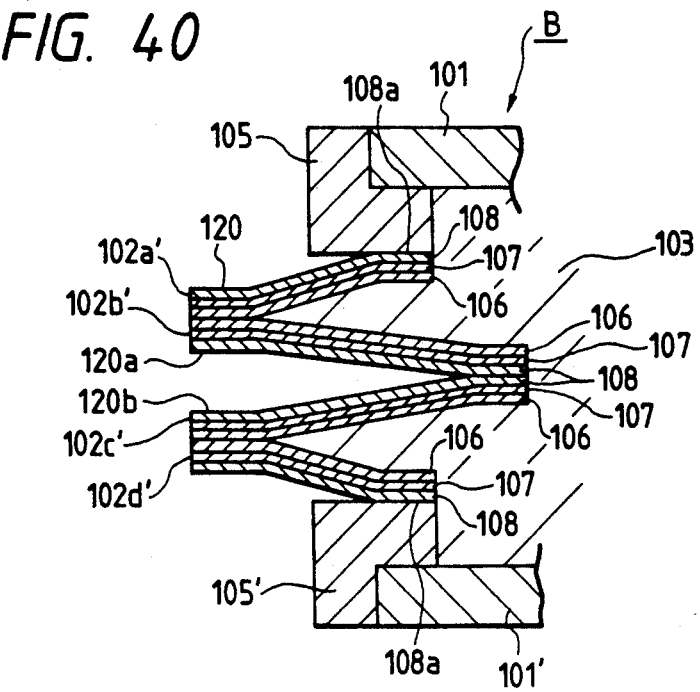
FIG. 40 is a lateral cross-sectional view of a general connecting member.

The above-explained 6th embodiment is featured, as shown in FIG. 40, by the connecting member 120 with modified Y-shaped cross section, consisting of alternately arranged bellows-shaped connecting members 102, for connecting the parallel-faced flat plates 101, 101'. Also three or more connecting members may be provided if the optical device has enough rigidity.

In the following there will be explained the difference in the required deforming stress, resulting from the difference in the shape of the connecting member for the optical device, in the aforementioned 6th embodiment and in the conventional structure.

Figure 41:
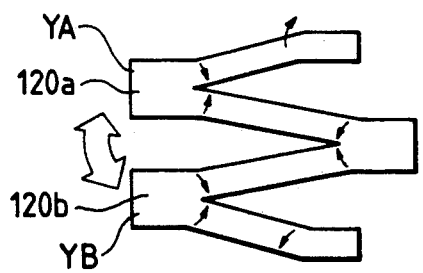
FIG. 41 is a lateral cross-sectional view showing the direction of deformation stress in a general connecting member.
Figure 42:
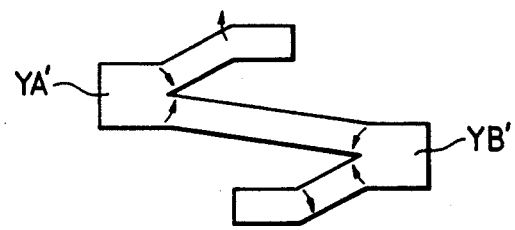
FIG. 42 is a lateral cross-sectional view showing the direction of deformation stress in the 6th embodiment.

FIG. 40 is a cross-sectional view of a conventional connecting member, and FIGS. 41 and 42 are views showing the directions of deforming stress in the conventional structure and in the above-explained 6th embodiments.

FIG. 40 illustrates a conventional optical device B, wherein a connecting member 120 composed of a flexible material such as plastics, molded in an I-shaped cross section, is thermally adhered to the peripheries of annular support members 105, 105'. When a compression deformation is generated by a biasing force applied to a part of said conventional connecting member 120, the deformation stress appears over the entire connecting member 120 as indicated by arrow in FIG. 41. However, if the Y-shaped members YA, YB mutually interfere at the end portions such as by collision, the biasing force becomes excessively large beyond such interference, as the amount of deformation is no longer proportional to the biasing force. On the other hand, in the connecting member 102 with modified Y-shaped cross section, the driving force required for deformation does not increase even when the amount of deformation increases as the modified Y-shaped members YA', YB' do not interfere mutually as shown in FIG. 42.

In the following there will be explained the result of measurement of the required driving force, conducted on the samples of the aforementioned connecting members 102 and 120.

Figure 43:
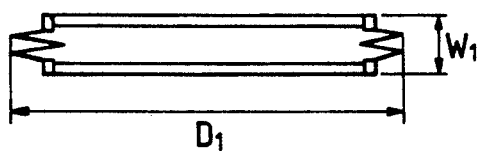
FIGS. 43 and 44 are schematic views showing optical devices with connecting members of different shapes.
Figure 44:
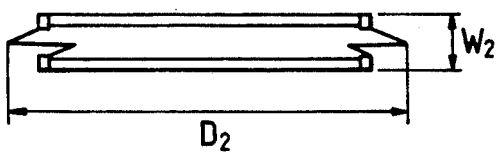

FIGS. 43 and 44 are schematic views of optical devices different in the shape of the connecting member, respectively corresponding to the devices B and A shown in FIGS. 40 and 38A. Wa and W2 indicate the widths of the optical devices, and D1 and D2 indicate the diameters thereof. Parameters used in the measurements were W1, W2=10 mm, and D1, D2=74 mmφ. The connecting members 102, 120 were composed of films of a thickness of 70 μm of a three-layered structure of PE (polyethylene)/EVOH (ethylene-vinyl alcohol copolymer)/PE, and were thermally adhered to the support members 105, 105' of a diameter of 64 mm, composed of LLDPE (linear low-density polyethylene).

Figure 62:
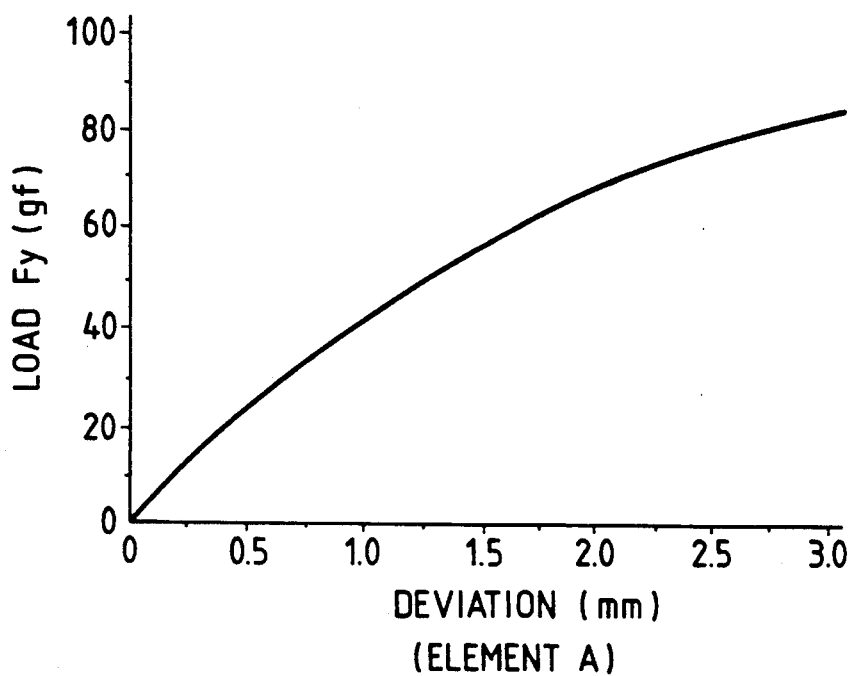
FIGS. 62 and 63 are schematic views of an relationship between deviation and load Fy required as the deforming force, averaged over seven samples on each of the optical devices, A and B.
Figure 63:
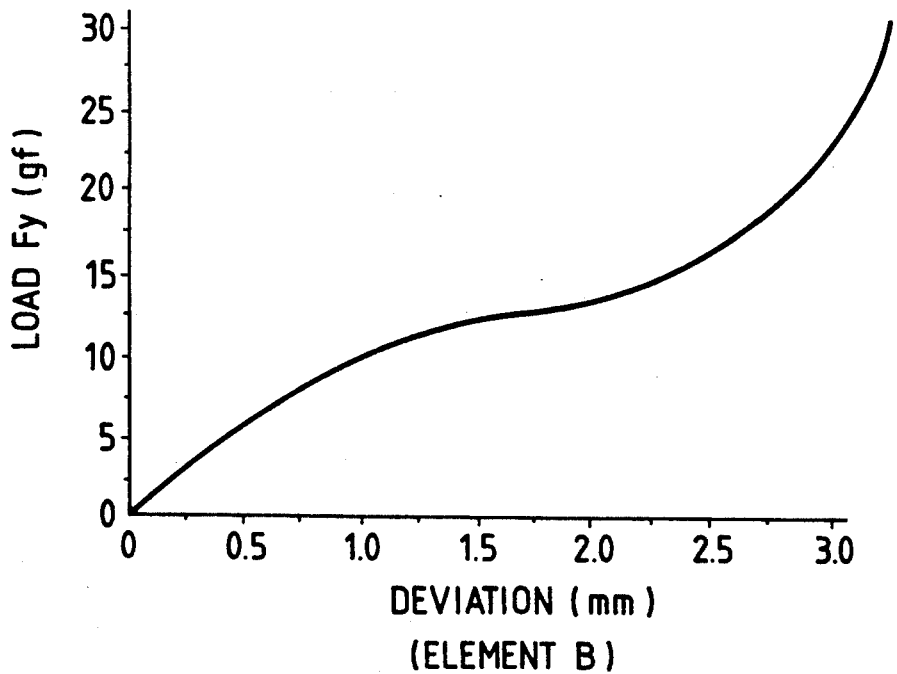
Figure 64:
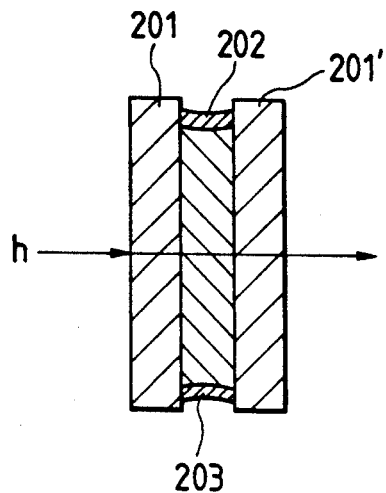
FIGS. 64 to 67 are views showing conventional optical devices.
Figure 65:
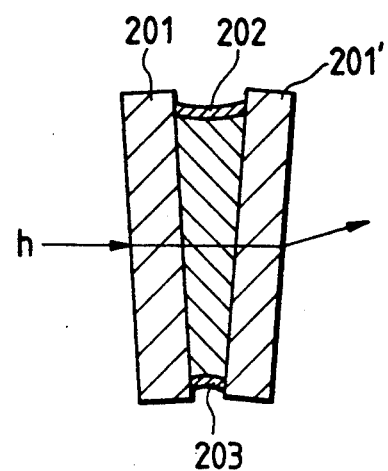
Figure 66:
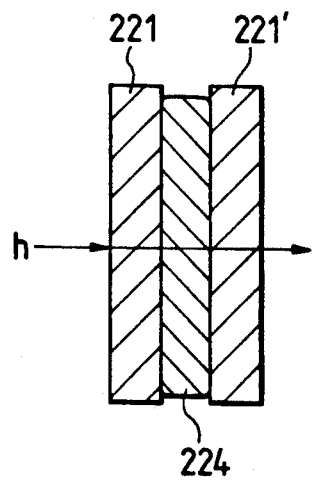
Figure 67:
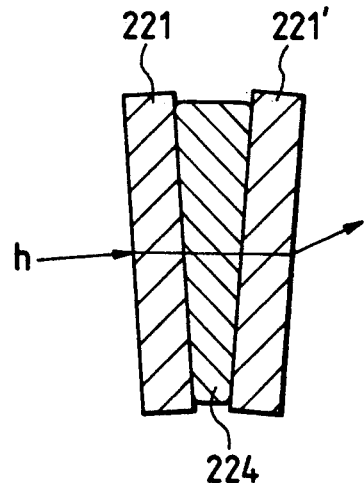

FIGS. 62 and 63 are charts showing relationship between the deviation in mm and the load Fy in gram force (gf) required for the deformation driving force, averaged over seven samples of each of the devices A and B. Comparison of FIGS. 62A and 62B indicates that the driving force, which increases rapidly after a certain deformation in the device B, does not show such rapid increase in the device A but only shows a relatively linear increase, whereby the control is extremely facilitated in small and large deformations.

In the following there will be explained the producing method of the optical device, taking that of the 6th embodiment as an example.

FIGS. 45 to 55 illustrate the producing method for the optical device A of the 6th embodiment.

Figure 45:
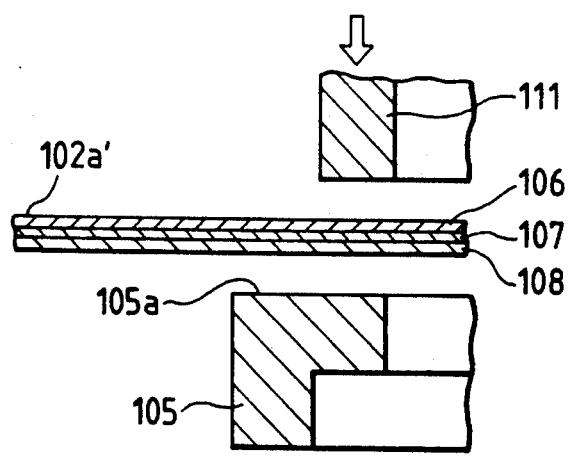
FIGS. 45 to 55 are views showing producing method for the optical device A of the 6th embodiment.
Figure 46:
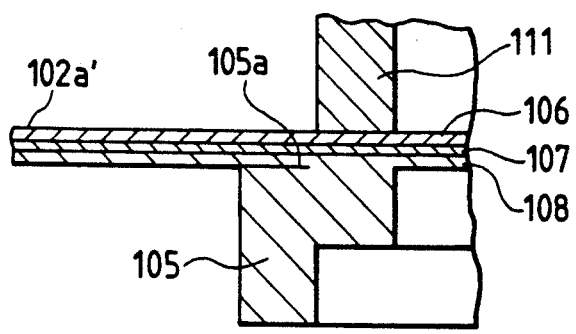

At first an annular support member 105 of L-shaped cross section, molded or worked with a sufficient precision, is prepared, and a member 2a' (three-layered laminate film consisting of a film adhesion layer 106, a barrier layer 107 and a mold adhesion layer 108) for constituting the connecting member 102 is positioned, as shown in FIG. 45, above an adhesion face 105a of the support member 105, in such a manner that said support member 105 faces the mold adhesion layer 108, similar in material to said support member, of the elastic member 2a'. Then a cylindrical thermal adhesion apparatus 111 positioned above is moved as indicated by an arrow in FIG. 45, whereby a part of the adhesion face 105a of the support member 105 is annularly adhered by thermal fusion to the mold adhesion layer 108 under pressure contact. Said thermal adhesion apparatus 111 can for example be a heat press employing a metal jig of good thermal conductivity such as of aluminum, copper or brass, an impulse sealer employing an instantaneous heat-generating member by current supply, an ultrasonic welder utilizing small vibration and pressure, or a high frequency induction heater. An optimum apparatus can be selected, within the scope of the present invention, in consideration of the used materials, shape, productivity and cost.

Figure 47:
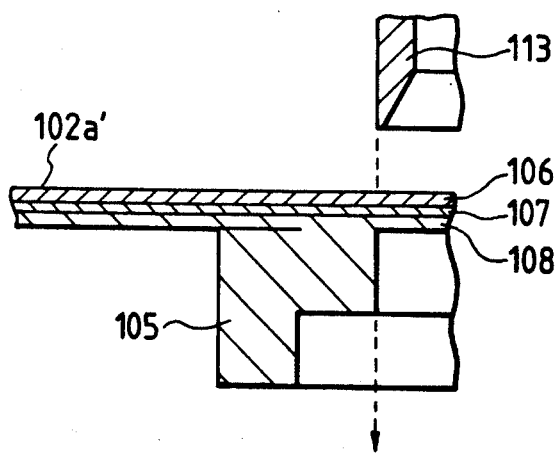
Figure 48:
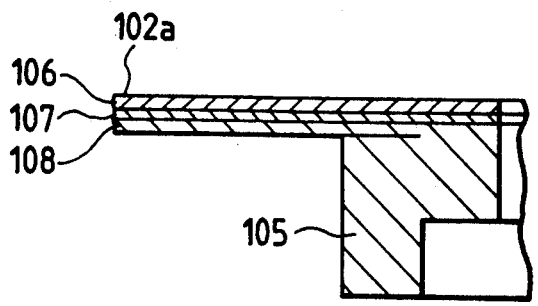
Figure 49:
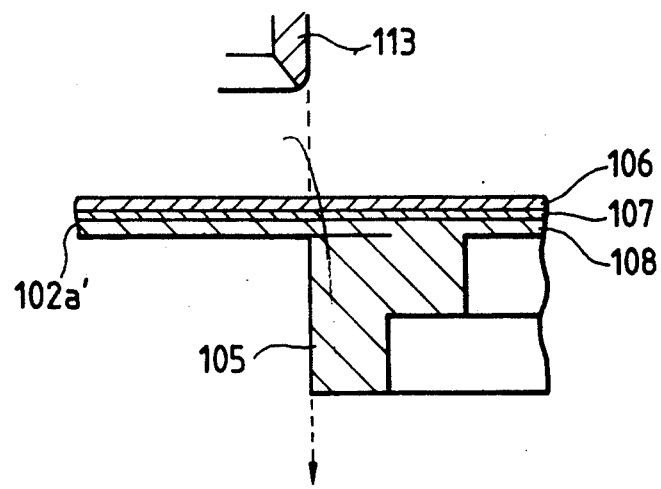

Then, as shown in FIG. 47, a cylindrical cutter 113 is positioned above for cutting the internal periphery of the elastic member 102a', and said member is cut along a broken-lined arrow, whereby the internal periphery of the elastic member 102a' coincides with that of the support member 105 as shown in FIG. 48 to obtain an intermediate component $\alpha$. Also the elastic member 102a is cut, as shown in FIG. 49, in such a manner that the external periphery coincides with that of the support member 105, thereby obtaining an intermediate component $\beta$. The cutter 113 can be of any type, such as a shearing cutter utilized in the press punching, or a cutter blade made of steel.

Figure 50:
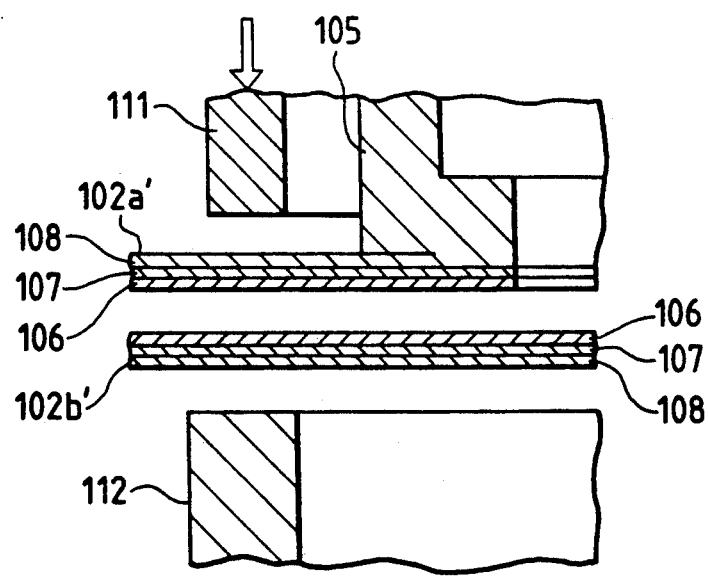
Figure 51:
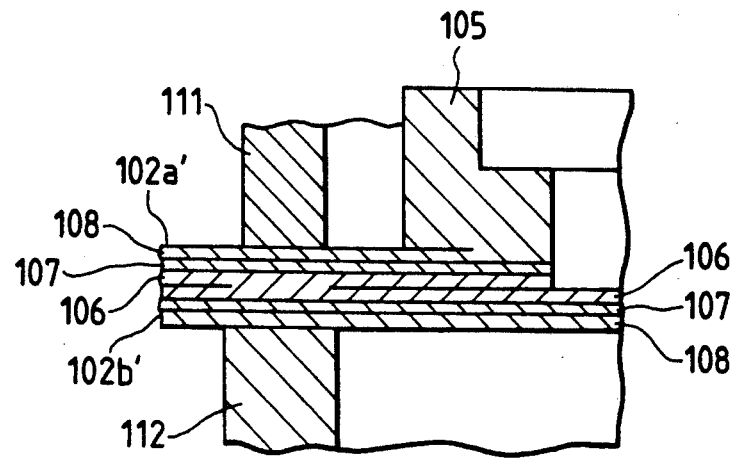

Then the intermediate component $\alpha$ obtained in the step shown in FIG. 48 is positioned opposite to the adhesion layer 106 of the elastic member 102b' as shown in FIG. 50, and the thermal adhesion apparatus 111 and a cylindrical retainer 112 are positioned in mutually opposed manner, outside the external periphery of the support member 105. Then, as shown in FIG. 51, the two laminate film members 102a', 102b' are thermally adhered in a part (pressed between the thermal adhesion apparatus 111 and the cylindrical retainer 112) of the mutually opposed film adhesion layers 106, 106, to obtain an intermediate component $\gamma$. The retainer 112 is composed of a metal overcoated or laminated with rubber or teflon and is used as an auxiliary table for evenly and efficiently applying the pressure of the thermal adhesion apparatus 111 to the films.

Figure 52:
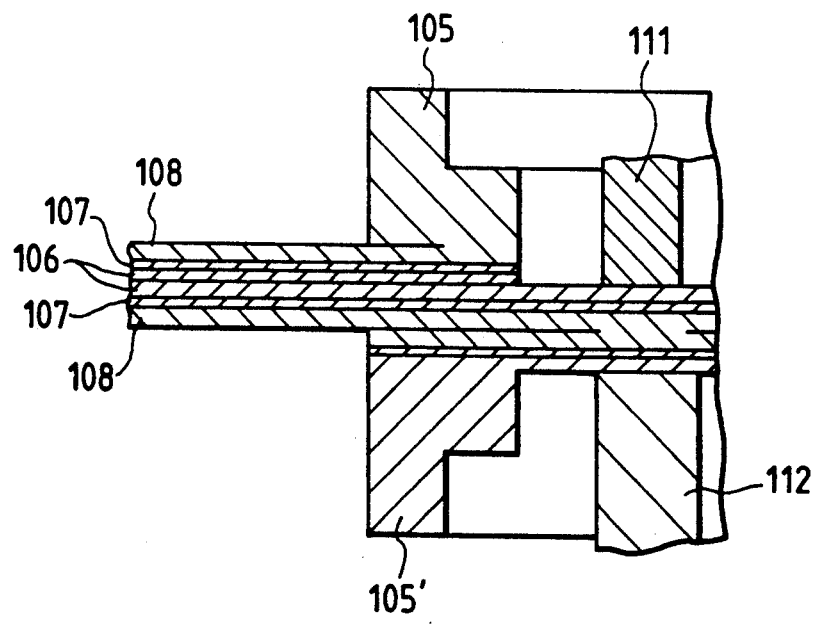

Subsequently the intermediate components $\gamma$, $\beta$ respectively obtained in the steps shown in FIGS. 51 and 49 are so positioned as shown in FIG. 52, and the thermal adhesion apparatus 111 and the retainer 112 are positioned inside the internal periphery of the support member 105. Then as shown in FIG. 52, the two laminate film members 102b', 102c' are thermally adhered in a part (pressed between the thermal adhesion apparatus 111 and the retainer 112) of the mold adhesion layers 108, 108.

Figure 53:
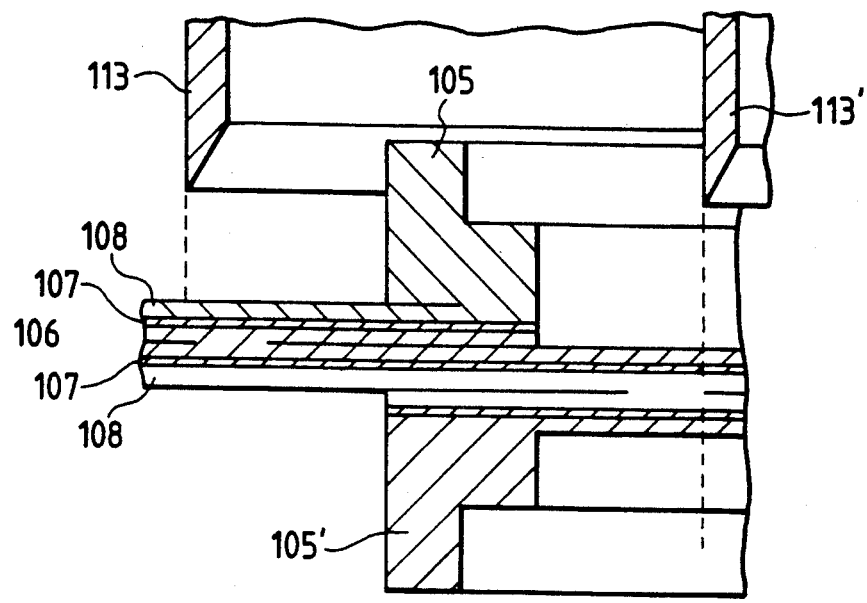
Figure 54:
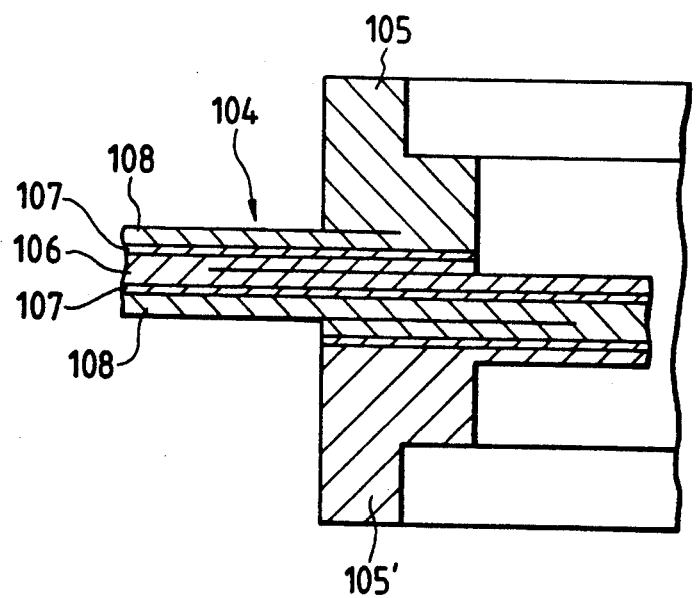

Then, as shown in FIG. 53, the cutter 113 is moved along a broken-lined arrow to cut the inside of the annular adhered portion shown in FIG. 52. Thus, as shown in FIG. 54, the two intermediate components mentioned above are integrally connected, thereby forming a connecting member 104 of a bellows structure.

Figure 55:
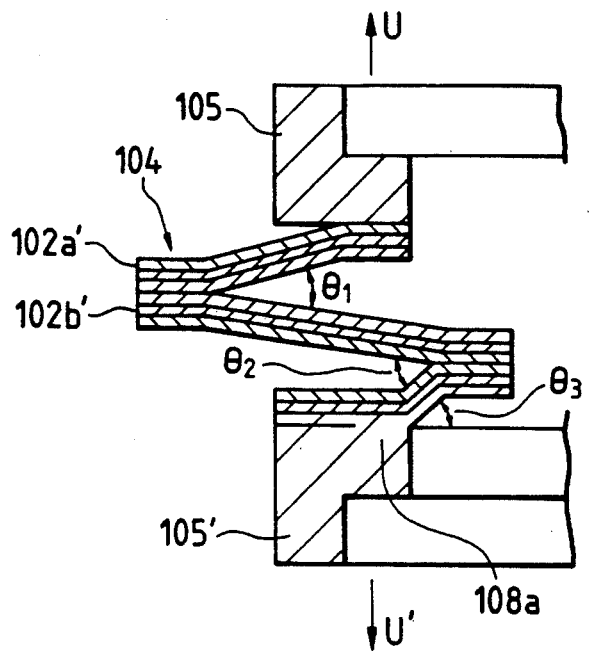

Then, as shown in FIG. 55, the elastic members constituting the integrated intermediate connecting member 104 are spread in directions U, U' to the fixed positions of parallel-faced flat plates 101, 101', in order to provide the connections of the elastic members with angles $\theta_1-\theta_3$. Thus the connecting member 104 is given the Y-shaped cross section. Said flat plates 101, 101' are positioned in advance with a predetermined reference distance therebetween, but each plate is supported at only one point so as to maintain said reference distance. Thus, if the edges of the flat plates 101, 101' are pinched at a point, the distance of said plates is reduced at such pinched position and increases at a point-symmetric position with respect to the center of said plates 101, 101'. In this manner the distance between the flat plates 101, 101' is variable except in the fixed support point of said plates.

Subsequently the parallel-faced flat plates 101, 101' are adhered with resinous or rubber adhesive, and, after the hardening of the adhesive, absence of leakage is confirmed with a helium leak tester. After said confirmation, the transparent material 103 is filled through an inlet formed in the resin or in the film, and said inlet is subsequently sealed by fusion or adhesion. Thus the optical device 120 is completed as shown in FIG. 40.

The above-explained producing method improves the reliability of adhesion of the connecting member and simplifies the procedure, by adhering the connecting member, for varying the vertical angle of two parallel-faced flat plates, by thermal fusion.

More specifically, the reduced driving force required for the optical device allows to reduce the drive source or power source of the equipment in which said optical device is to be incorporated. For example the optical device of the present invention may be incorporated into a compact camera in which the vibration compensating optical system could not be employed in the past.

Also the complete vapor barrier property achieved by the use of aluminum foil, evaporated aluminum layer, chlorinated or fluorinated film in a part of the films constituting the connecting member allows to prevent contamination of the internal liquid with water vapor. Thus said internal liquid is protected from fluctuation in refractive index or loss in optical transmittance, so that the optical device can be effectively protected from deterioration of the optical performance.

Furthermore, the adhesion of the connecting member by thermal fusion improves the reliability of said adhesion and simplifies the producing process.

In the following there will be explained variations of the optical device A of the 6th embodiment, with reference to cross-sectional views in FIGS. 56 to 59.

Figure 56:
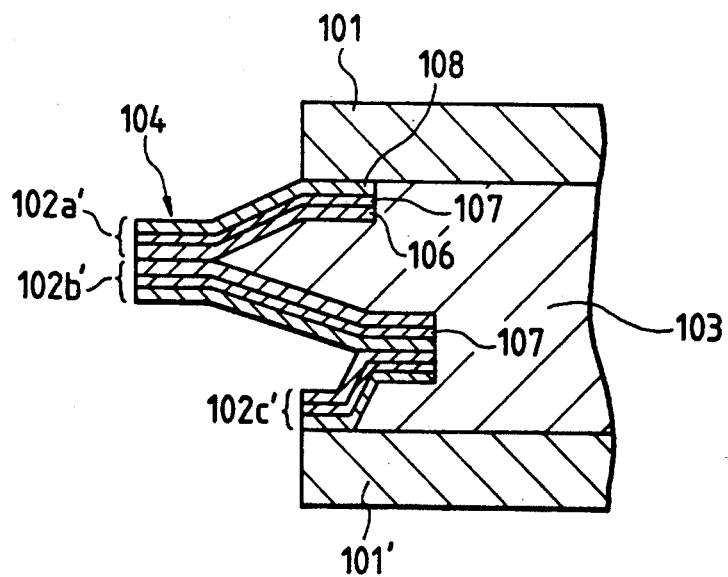
FIGS. 56 to 59 are lateral cross-sectional views showing variations of the 6th embodiment.

FIG. 56 shows a first variation. Parallel-faced flat plates 101, 101' are composed of a transparent plastic material, such as polycarbonate, and a same material is employed in the elastic members 102a'-102c' of the connecting member 104. Use of a same material, for example a polycarbonate film in the mold adhesion layer 108 of the laminate film enables direct adhesion of the flat plates 101, 101' with the mold adhesion layers 108, 108' of the elastic members 102a, 102a', dispensing with the support members 105, 105' for supporting said flat plates 101, 101'.

The present first variation thus enables to reduce the number of component parts of the optical device, thereby contributing to improvement in efficiency and simplification of the work.

Figure 57:
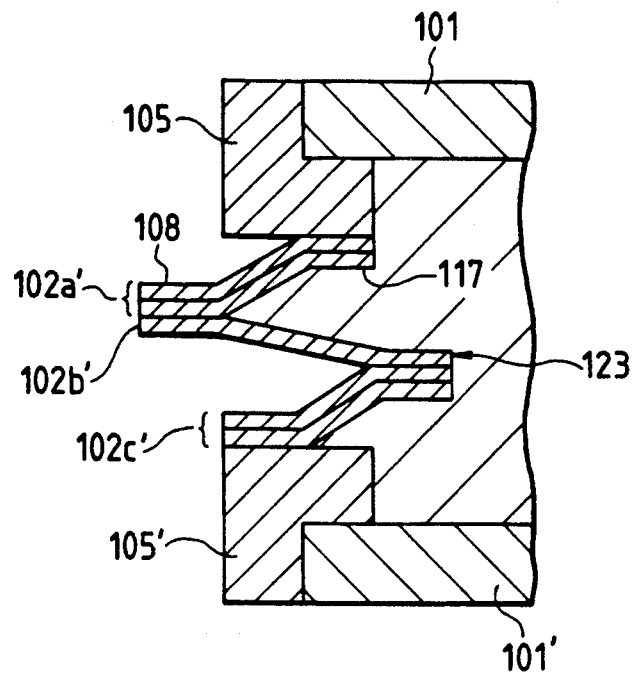

FIG. 57 shows a second variation, in which the connecting member 123 is composed of a film 117, composed for example of a fluorinated film with improved vapor barrier property and capable of adhesion by thermal fusion, thereby serving as the film adhesion layer 106 and the barrier layer 107. Examples of the material for said film 117 includes CTFE (polychlorotrifluoroethane), FEP (polyperfluoroethylene-propylene), PVDF (polyvinylidene fluoride) and PVDC (polyvinylidene chloride). The entire optical device can be simplified in structure, by constituting the elastic members 102a' and 102c' by a two-layered structure of the film 117 and a mold adhesion layer 108, and the elastic members 102b' and 102c' by the film 117.

Figure 58:
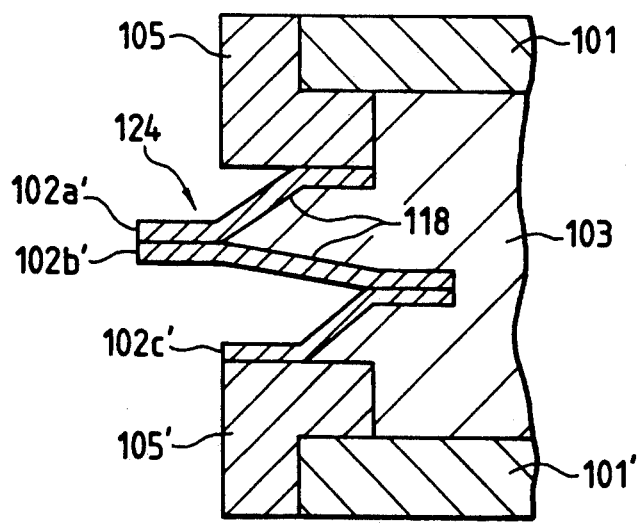

FIG. 58 shows a third variation in which each of the elastic members 102a'-102c' constituting the connecting member 124 is composed of a single-layered polymer film 118, which can be composed, for example, of polyester, polyamide, polycarbonate or polyethylene.

This third variation can further simplify the structure of the optical device in comparison with the second variation.

Figure 59:
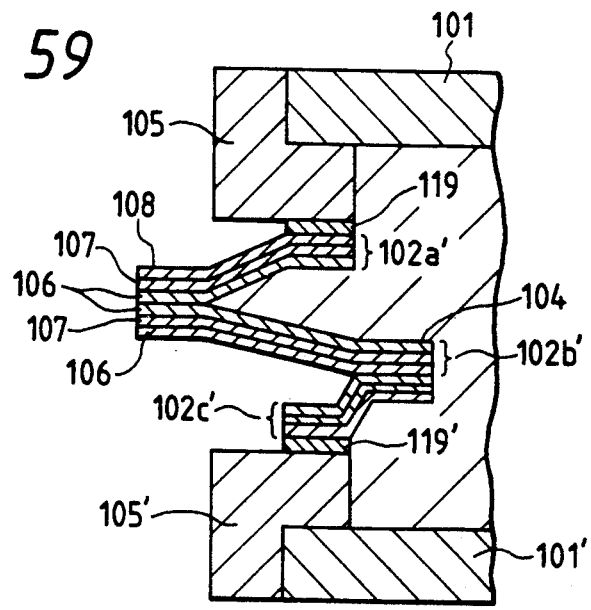

In the following there will be explained a fourth variation with reference to FIG. 59.

In the foregoing variations, the support members 105, 105' may be composed of metal if they have reference faces for the positional precision of the optical device and therefore require a high precision. In such case, the connecting member 104 may be adhered for example as shown in FIG. 59, by inserting a different material capable of thermal adhesion, such as hot-melt films 119, 119' between the mold adhesion layers 108, 108 of the elastic members 102a', 102c' and the metal support members 105, 105'.

Also ordinary liquid adhesive may be used for this purpose, and such adhesion is effective for improving the positional precision of the optical device.

Thus the fourth variation enables easy connection of the connecting member, regardless of the material constituting the support members 105, 105'.

The foregoing first to fourth variations are subject to various modifications in the mounting method of the connecting member, as long as within the scope of the present invention.

Figure 60A:
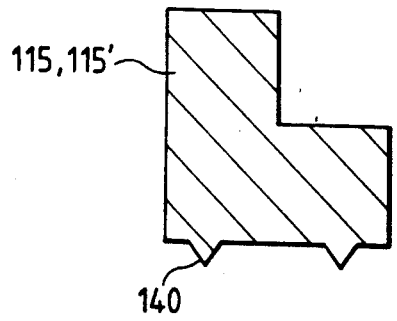
FIGS. 60A and 60B are lateral cross-sectional views showing principal parts of a support-member in 7th and 8th embodiments.
Figure 60B:
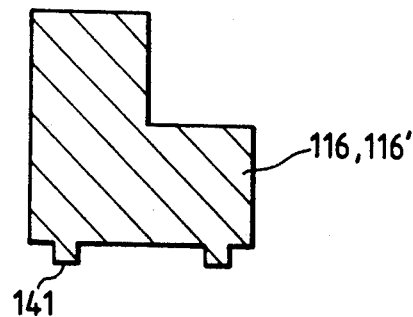
Figure 61A:
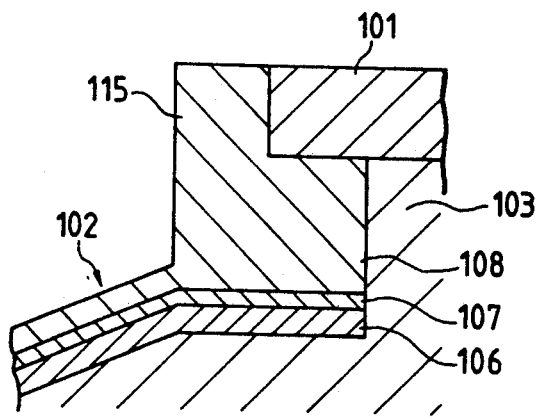
FIGS. 61A and 61B are lateral cross-sectional views showing principal parts of the optical device respectively of the 7th and 8th embodiments.
Figure 61B:
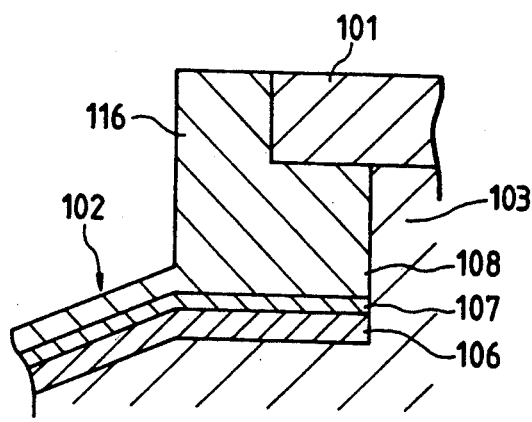

In the following there will be explained 7th and 8th embodiment of the present invention, with reference to FIGS. 60A and 60B which are cross-sectional views showing the principal parts of support members in said embodiments, and FIGS. 61A and 61B which are cross-sectional views showing the principal parts of the optical devices of said embodiments.

Support members 115, 115' and 116, 116', similar in material to those 105, 105' of the 6th embodiments, are provided with projections 140 of triangular cross section or those 141 of rectangular cross section, on the faces to be adhered to the mold adhesion layers 108, 108 of the connecting member 102. Said projection 140 or 141 may be provided in one to three positions as energy director.

The above-explained 7th and 8th embodiments create concentrated pressure in thermal adhesion, thereby avoiding uneven pressure and ensuring the adhesion work, thus improving the reliability of the optical device.

The above-explained 6th to 8th embodiments have been explained by disc-shaped optical devices, but the present invention is not limited to such devices and is applicable for example to rectangular devices as long as they are within the scope of the appended claims.

Also in other embodiments then the 6th one, the holes H may naturally be provided, as in the optical device A' shown in FIG. 38B, at positions to be subjected to deformation stress.

As explained in the foregoing, the present invention allows to vary the mutual angle of two opposed parallel-faced flat plates with a small driving force without loss, thereby providing a satisfactory optical device.

Also the present invention enables to produce such satisfactory optical device with a simple producing method.

What is claimed is:

1. An optical device, comprising in combination:
   a first transparent plate member on which light is incident, and a second transparent plate member from which said light is emitted, said plates being spaced apart from each other by a distance;
   first and second annular elastic members connecting said first and second transparent plate members,
   said first elastic member comprising an inside periphery that is connected with said first transparent member,
   said second elastic member comprising an inside periphery that is connected with said second transparent plate member,
   said first and second elastic members further comprising outside peripheries that are connected with each other,
   said first elastic member having an internal diameter that is greater than the internal diameter of said second elastic member; wherein
   a transparent and flexible material fills a space defined between said first and second transparent plate members by said first and second elastic members,
   whereby said optical device constitutes a variable-angle prism in which the first and second transparent plate members normally are substantially parallel, but can be changed therefrom by an external force.

2. An optical device, comprising in combination:
   a first transparent member having an incidence aperture on which light is incident;
   a second transparent member positioned away from said first transparent member by a distance, and having an emergence aperture from which said light is emitted, said emergence aperture being smaller than said incidence aperture;
   a plurality of at least three annular elastic members that connect said first and second transparent members,
   each of said elastic members comprising inner and outer peripheries, the inside periphery of said first elastic member being connected with said first transparent member; an outside periphery of said first elastic member being connected with the outside periphery of said second elastic member; the inside periphery of said second elastic member being connected with the inside periphery of said third elastic member, and the inside periphery of the last elastic member being connected with said second transparent member;
   each annular elastic member has an internal diameter that is gradually reduced from said first elastic member to said last elastic member; wherein,
   a transparent and flexible material fills a space formed between said first and second transparent plate by said plurality of annular elastic members,
   whereby said optical device comprises a variable-angle prism wherein a parallelism between said first and second transparent members can be changed by an external force.

3. An optical device, comprising in combination:
   a first transparent member on which light is incident, and a second transparent member rom which the incident light is emitted, both plates being spaced apart from each other by a vertical distance;

an annular elastic member that connects said first and second transparent members, a transparent and flexible material that fills a space formed between said first and second transparent members by said elastic member, wherein said elastic member further has a vertical cross section comprising at least one truncated cone between said first and second transparent members, and and said first transparent member further comprises an aperture that is greater than an aperture of said second transparent member.

* * * * *

UNITED STATES PATENT AND TRADEMARK OFFICE
CERTIFICATE OF CORRECTION

PATENT NO. : 5,168,385

DATED : December 1, 1992

INVENTOR(S) : KOBAYASHI, ET AL.

It is certified that error appears in the above-identified patent and that said Letters Patent is hereby corrected as shown below:

On the title page, Item [56]:

"3,544,201 1/1971 Fowler, et al." should read --3,544,201 1/1968 Fowler, et al.--

COLUMN 4:

Line 27, "an" should read --a--.

COLUMN 5:

Line 21, "Also" should read --Also,--.
Line 34, "Also" should read --Also,--.
Line 58, "following" should read --following,--.
Line 60, "of" should read --of an--.

COLUMN 6:

Line 60, "a ready" should read --already--.

COLUMN 9:

Line 6, "Also" should read --Also,--.
Line 47, "Also" should read --Also,--.

UNITED STATES PATENT AND TRADEMARK OFFICE
CERTIFICATE OF CORRECTION

PATENT NO. : 5,168,385
DATED : December 1, 1991
INVENTOR(S) : KOBAYASHI, ET AL.

It is certified that error appears in the above-identified patent and that said Letters Patent is hereby corrected as shown below:

COLUMN 11:

Line 27, "FIG. 22" should read --FIG. 22,--.
      Line 38, "Thus" should read --Thus,--.
      Line 48, "c" should be deleted.
      Line 50, "Subsequently" should read --Subsequently,--.
      Line 59, "Thus" should read --Thus,--.
      Line 66, "following" should read --following,--.

COLUMN 12:

Line 48, "Also" should read --Also,--.
      Line 59, "following" should read --following,--.
      Line 65, "member" should read --member 25--.

COLUMN 13:

Line 21, "Naturally" should read --Naturally,--.

COLUMN 14:

Line 30, "Also" should read --Also,--.
      Line 43, "Also" should read --Also,--.

COLUMN 15:

Line 15, "Thus" should read --Thus,--.
      Line 29, "quently" should read --quently,--.
      Line 55, "another" should be deleted.

UNITED STATES PATENT AND TRADEMARK OFFICE
CERTIFICATE OF CORRECTION

PATENT NO. : 5,168,385

DATED : December 1, 1992

INVENTOR(S) : KOBAYASHI, ET AL.

Page 3 of 5

It is certified that error appears in the above-identified patent and that said Letters Patent is hereby corrected as shown below:

COLUMN 16:

Line 2, "method" should read --method of--.
Line 25, "Also" should read --Also,--.
Line 28, "Also" should read --Also,--
Line 53, "sequently" should read --sequently,--.

COLUMN 17:

Line 12, "Also" should read --Also,--.

COLUMN 18:

Line 27, "following" should read --following,--.
Line 34, "Wa" should read --$W_1$-- and "W2" should read --$W_2$--.
Line 35, "D1 and D2" should read --$D_1$ and $D_2$--.
Line 37, "W1,W2 = 10 mm, and D1,D2 = 74 mm$\phi$" should read --$W_1,W_2$ = 10 mm, and $D_1,D_2$ = 74 mm$\phi$--.
Line 55, "following" should read --following,--.

COLUMN 19:

Line 23, "Also" should read --Also,--.
Line 30, "Then" should read --Then,--.
Line 46, "Subsequently" should read --Subsequently,--.
Line 67, "Thus" should read --Thus,--.

UNITED STATES PATENT AND TRADEMARK OFFICE
CERTIFICATE OF CORRECTION

PATENT NO. : 5,168,385

DATED : December 1, 1992

INVENTOR(S) : KOBAYASHI, ET AL.

It is certified that error appears in the above-identified patent and that said Letters Patent is hereby corrected as shown below:

COLUMN 20:

Line 11, "Subsequently" should read --Subsequently,--.
Line 27, "example" should read --example,--.
Line 31, "Also" should read --Also,--.
Line 36, "Thus" should read --Thus,--.
Line 51, "example" should read --example,--.

COLUMN 21:

Line 15, "following" should read --following,--.
Line 27, "Also" should read --Also,--.
Line 30, "Thus" should read --Thus,--.
Line 37, "following" should read --following,--.
Line 63, "Also" should read --Also,--.

UNITED STATES PATENT AND TRADEMARK OFFICE
CERTIFICATE OF CORRECTION

PATENT NO. : 5,168,385
DATED : December 1, 1992
INVENTOR(S) : KOBAYASHI, ET AL.

It is certified that error appears in the above-identified patent and that said Letters Patent is hereby corrected as shown below:

COLUMN 22:

Line 3, "Also" should read --Also,--.
Line 68, "rom" should read --from--.

COLUMN 24:

Line 4, "and" should be deleted.

Signed and Sealed this

First Day of March, 1994

*Attest:*

BRUCE LEHMAN

*Attesting Officer*     *Commissioner of Patents and Trademarks*